United States Patent [19]
Cowan et al.

[11] Patent Number: 5,828,840
[45] Date of Patent: Oct. 27, 1998

[54] SERVER FOR STARTING CLIENT APPLICATION ON CLIENT IF CLIENT IS NETWORK TERMINAL AND INITIATING CLIENT APPLICATION ON SERVER IF CLIENT IS NON NETWORK TERMINAL

[75] Inventors: Richard Cowan, Honolulu, Hi.; Gordon P. Eckley, Foresthill, Calif.; Prasad V. R. Panchangam, San Mateo, Calif.; Winston C. W. Leong, Roseville, Calif.

[73] Assignee: Verifone, Inc., Santa Clara, Calif.

[21] Appl. No.: 692,489

[22] Filed: Aug. 6, 1996

[51] Int. Cl.⁶ .................................................. G06F 13/00
[52] U.S. Cl. ........................................................ 395/200.33
[58] Field of Search ..................... 395/200.33, 200.35, 395/200.49, 200.51, 200.47, 200.54, 200.57, 684, 182.02

[56] References Cited

U.S. PATENT DOCUMENTS

| | | | |
|---|---|---|---|
| 3,956,615 | 5/1976 | Anderson et al. | 235/61.7 B |
| 4,277,837 | 7/1981 | Stuckert | 364/900 |
| 4,303,904 | 12/1981 | Chasek | 340/23 |
| 4,454,414 | 6/1984 | Benton | 235/379 |
| 4,614,861 | 9/1986 | Pavlov et al. | 235/380 |
| 4,630,201 | 12/1986 | White | 364/408 |
| 4,689,478 | 8/1987 | Hale et al. | 235/380 |
| 4,766,293 | 8/1988 | Boston | 235/379 |
| 4,780,821 | 10/1988 | Crossley | 395/200.33 |
| 4,859,837 | 8/1989 | Halpern | 235/380 |
| 4,877,950 | 10/1989 | Halpern | 235/487 |

(List continued on next page.)

FOREIGN PATENT DOCUMENTS

| | | |
|---|---|---|
| 0 172 670 A2 | 2/1986 | European Pat. Off. |
| 0 256 768 A2 | 2/1988 | European Pat. Off. |
| 0 256 768 A3 | 2/1988 | European Pat. Off. |
| 0 363 122 A2 | 4/1990 | European Pat. Off. |
| 0 363 122 A3 | 4/1990 | European Pat. Off. |
| 0 256 768 B1 | 3/1994 | European Pat. Off. |
| 0 363 122 B1 | 12/1994 | European Pat. Off. |
| WO 91/16691 | 10/1991 | WIPO |
| WO 93/08545 | 4/1993 | WIPO |

OTHER PUBLICATIONS

Anderson, R.J., *UEPS—A Second Generation Electronic Wallet*, (1992) University of Cambridge Computer Laboratory, pp. 411–418.

Bank Systems Technology, SET Tool Kit for Secure Commerce, (May 1996) p. 16.

Bellare et al., iKP—A Family of Secure Electronic Payment Tools, USENIX Association, First USENIX Workshop on Electronic Commerce, (Jul. 11–12, 1995) pp. 89–106.

Bryant, A., Am I Bid Six? Click to Bid Six!, The New York Times, (Mar. 13, 1996) pp. D1–D6.

Camp et al., Token and Notational Money in Electronic Commerce, USENIX Association, First USENIX Workshop on Electronic Commerce, (Jul. 11–12, 1995), pp. 1–12.

(List continued on next page.)

*Primary Examiner*—Moustafa M. Meky
*Attorney, Agent, or Firm*—Warren & Perez

[57] ABSTRACT

A plurality of clients are connected to one or more servers. When a client initiates a connection with a server, the server responds to the request for connection by transmitting a message back to the client to determine whether the client is a network terminal or not. The client responds with a message that is received by an application dispatcher at the server which takes one of a pair of actions based on whether the client is a network terminal. If the client terminal is a network terminal, then the application dispatcher spawns a server application in the server which responds to the client application in the client. Going forward, the server application responds to all future requests from the client application. If the client is not a network terminal, then the application dispatcher initiates a client application in the server to service the client terminal application requirements. Requests from the client application on behalf of the client terminal are subsequently serviced by a server application at the server which communicates to the client terminal via the client application at the server.

25 Claims, 14 Drawing Sheets

U.S. PATENT DOCUMENTS

| | | | |
|---|---|---|---|
| 4,906,828 | 3/1990 | Halpern | 235/379 |
| 4,935,962 | 6/1990 | Austin | 380/25 |
| 4,949,248 | 8/1990 | Caro | 395/200.33 |
| 4,968,873 | 11/1990 | Dethloff et al. | 235/380 |
| 4,992,646 | 2/1991 | Collin | 235/375 |
| 5,016,274 | 5/1991 | Micali et al. | 380/23 |
| 5,030,806 | 7/1991 | Collin | 235/375 |
| 5,175,416 | 12/1992 | Mansvelt et al. | 235/379 |
| 5,221,838 | 6/1993 | Gutman et al. | 235/379 |
| 5,249,293 | 9/1993 | Schreiber et al. | 395/200.33 |
| 5,341,478 | 8/1994 | Travis, Jr. et al. | 395/200.33 |
| 5,420,405 | 5/1995 | Chasek | 235/379 |
| 5,440,634 | 8/1995 | Jones et al. | 380/24 |
| 5,448,045 | 9/1995 | Clark | 235/382 |
| 5,452,352 | 9/1995 | Talton | 379/355 |
| 5,453,601 | 9/1995 | Rosen | 235/379 |
| 5,455,407 | 10/1995 | Rosen | 235/380 |
| 5,459,304 | 10/1995 | Eisenmann | 235/380 |
| 5,465,291 | 11/1995 | Barrus et al. | 379/67 |
| 5,476,259 | 12/1995 | Weingardt | 273/85 |
| 5,478,993 | 12/1995 | Derksen | 235/380 |
| 5,485,510 | 1/1996 | Colbert | 379/145 |
| 5,546,583 | 8/1996 | Shriver | 395/680 |
| 5,583,563 | 12/1996 | Wanderscheid et al. | 348/13 |
| 5,640,564 | 6/1997 | Hamilton et al. | 395/683 |
| 5,671,414 | 9/1997 | Nicolet | 395/684 |

OTHER PUBLICATIONS

Cox et al., NetBill Security and Transaction Protocol, USENIX Association, First USENIX Workshop on Electronic Commerce, (Jul. 11–12, 1995) pp. 77–88.

One–Click Software Distribution Via the Web, Cutting Edge, Datamation, (May 1, 1996), p. 16.

Software Taps Net for Supply Data Sharing, Purchasing, EBN, (Apr. 22, 1996), p. 50.

Flohr, U., Electronic Money, Byte, (Jun. 1996), p. 74.

Gifford, et al., Payment Switch for Open Networks, USENIX Association, First USENIX Workshop on Electronic Commerce, (Jul. 11–12, 1995), pp. 69–75.

Gosling, et al., *The Java Language Environment a White Paper*, Sun Microsystems Computer Company, (May 1995).

Jones, et al., Securing the World Wide Web, Smart Tokens and Their Implementation, World Wide Web Journal, O'Reilly & Associates, Inc., (Dec. 11–14, 1995), pp. 397–409.

Kamens, J., Retrofitting Network Security to Third–Party Applications—The SecureBase Experience, USENIS Association, UNIX Security Symposium IV, (1993) pp. 41–57.

Marshall, M., Banking on the Internet, Communications Week, (May 20, 1996) No. 611.

Messmer, E., ActiveX Pioneer Pushes a Commerce, Network World, (May 6, 1996) p. 33, 46–47.

Messmer, E., Edify Soft to Let Banks Open Doors Online, Network World, (May 20, 1996).

Messmer, E., Start–Up Puts Security SOCKS on Window Apps, Network World, (May 20, 1996).

Microsoft and VeriFone Announce Agreement to Deliver Commerce–enabled Internet Retailing Solutions, Microsoft Press Release, (Aug. 5, 1996) pp. 1–3.

Real Security, Mondex Magazine, (Summer 1996) pp. 5–6.

What's Up Doc?, That's Infotainment, Mondex Magazine, (Summer 1996) pp. 8–10.

Ready to Go. The Trillion Yen Business, Mondex Magazine, (Summer 1996) pp. 27–29.

Morgan, L., Cashing In: The Rush is on to Make Net Commerce Happen, Internet World, (Feb. 1995), pp. 48–51.

Nash, et al., Vendors Deliver IS–Specific Apps Over the 'Net, News (May 6, 1996) p. 16.

Nee, E., Hatim Iyabji, Upside, (Sep. 1996) pp. 85–93.

Neuman, et al., *Requirements for Network Payment: The NetCheque™ Perspective*, University of Southern California, (1995) pp. 32–36.

Ozer, K., Online Software Stores, PC Magazine, (May 28, 1996), p. 36.

Rodriquez, K., Pushing the Envelope, Communications Week, (May 13, 1996) pp. 37–39.

Rupley, S., Digital Bucks? Stop Here, PC Magazine, (May 28, 1996), pp. 54–60.

Semilof, M., Boosting Web Business, Communications Week, (May 20, 1996) pp. 31–32.

Sibert et al., The DigiBox: A Self–Protecting Container for Information Commerce, First USENIX Workshop on Electronic Commerce, (Jul. 11–12, 1995), pp. 171–183.

Sirbu, et al., NetBill: An Internet Commerce System Optimized for Network Delivered Services, Carnegie Mellon University, (1995) pp. 20–25.

Sliwa, C., Netscape Unveils New 'Net Commerce Offerings, Network World, (May 13, 1996) p. 10.

Singleton, A., Cash on the Wirehead, Byte, (Jun. 1995) pp. 71–78.

Tang, et al., A Set of Protocols for Micropayments in Distributed Systems, First USENIX Workshop on Electronic Commerce, (Jul. 11–12, 1995) pp. 107–115.

Thompson, et al., A Secure Public Network Access Mechanism, UNIX Security Symposium, (1992) pp. 227–238.

Trommer, D., ECS Catalog Merges EDI/Net Platforms: Enables Online Ordering in EDI Format Over Net, EBN, (May 20, 1996) p. 54.

Trommer, D., GE/Netscape Form Software Venture: Will Focus on Electronic Commerce Solutions, EBN, (Apr. 22, 1996) p. 54.

Vaughan–Nichols, Steven, XVision Turns a PC Into X Terminal for Unix, VMS Host, Government Computer News, Jul. 8, 1996, pp. 38, 42.

Vincenzetti et al., *STEL: Secure TELnet*, 5th UNIX Security Symposium, Jun. 5–7, 1995.

Wexler, Joanie, AT&T Sell Insurers on the Web, Network World, May 20, 1996, p. 27.

Wiggins, Richard, Business Browser: A Tool to Make Web Commerce Secure, Internet World, Feb. 1995, pp. 52, 54, 55.

Yacobi, Yacov, Efficient Electronic Money, Official Gazette, Apr. 23, 1996, p. 2976.

Yee et al., Secure Coprocessors in Electronic Commerce Applications, First USENIX Workshop on Electronic Commerce, Jul. 11–12, 1995, pp. 155–169.

ABA Banking Journal, Will SET Kill Card Fraud On the Internet?, Apr., 1996, pp. 237–238.

Advertising Age, Visa Turns To Redgate for Online, CD–Rom Work; Sample the Surf; Checkfree, Cybercash Interact; New on the 'Net; EDS Joins the Cyber–Rush, Jul. 17, 1995, pp. 249–250.

AFX News, Microsoft, American Express Unit Sign Internet Payment System Agreement, Feb. 29, 1996, p. 427.

Agence France Presse, Visa, Matercard Announce Security Standard for Internet, Feb. 1, 1996, p. 85.

The American Banker, Vendors Ready—and Waiting—for E–Commerce, Feb. 2, 1996, pp. 47–50.

The American Banker, News Analysis: Despite Accord, Hard Work Ahead On Security Standard for Internet, Feb. 2, 1996, pp. 51–53.

The American Banker, Microsoft Signs Visa as a Processor; Pact Gives Banks Alternative to Intuit, Feb. 14, 1996, pp. 528–529.

The American Banker, Two New On–Line Alliances Pair Niche Leaders, Feb. 21, 1996, pp. 493–494.

The American Banker, News Analysis: Beware of Deals Like Verifone–Oracle, Banks Told, Feb. 27, 1996, pp. 443–445.

The American Banker, Amex Accepts SET Protocol For Payments On Internet, Mar. 1, 1996, pp. 382–383.

The American Banker, Encryption Software Firm Adopts On–Line Protocol, Mar. 14, 1996, p. 352.

The American Banker, Frontiers, Mar. 18, 1996, pp. 317–319.

The American Banker, Card Briefs: Novus Supporting SET Payment Protocol, Apr. 2, 1996, p. 235.

The American Banker, If It Has To Do With Data Security, Changes Are This 'Little' Company Is in Involved, Apr. 15, 1996, pp. 156–160.

The American Banker, On the Question of Internet Security, A Three–Sided Debate, Apr. 15, 1996, pp. 161–165.

The American Banker, Web Security Firm To Add MC–Visa Protocol, Apr. 23, 1996, pp. 130–131.

The American Banker, Card Briefs: ICverify Internet Tools To Get SET Protocol, May 3, 1996, p. 53.

The American Banker, Mastercard Official Resigns To Lead Internet Security Firm, May 3, 1996, pp. 54–55.

American Marketplace, Visa–Mastercard Security Agreement: A Green Light For Online Commerce, Feb. 8, 1996, pp. 5–6.

Amusement Business, More 'Digital Homeless' Find Place in Cyberspace; Professionals Not Subscribing To An Online Computer Service, Feb. 12, 1996, pp. 536–537.

AP Online, Cable TV's Sci–Fi Channel, Jun. 9, 1995, pp. 259–261.

AP Online, Purchases On Net Studied, Jan. 31, 1996, pp. 171–172.

AP Online, AP Top News At 5 a.m. EST Thursday, Feb. 1, 1996, Feb. 1, 1996, pp. 86–88.

AP Online, AP Top News At 6 a.m. EST Thursday, Feb. 1, 1996, Feb. 1, 1996, pp. 89–91.

AP Online, AP Top News At 7 a.m. EST Thursday, Feb. 1, 1996, Feb. 1, 1996, pp. 92–94.

AP Online, AP Top News At 8 a.m. EST Thursday, Feb. 1, 1996, Feb. 1, 1996, pp. 95–97.

AP Online, AP Top News At 9 a.m. EST Thursday, Feb. 1, 1996, Feb. 1, 1996, pp. 115–117.

AP Online, AP Financial News At 9:10 a.m. EST Thursday, Feb. 1, 1996, Feb. 1, 1996, pp. 118–122.

AP Online, AP Top News At 10 a.m. EST Thursday, Feb. 1, 1996, Feb. 1, 1996, pp. 125–127.

AP Online, Standard Found For Web Credit, Feb. 1, 1996, pp. 123–124.

AP Online, AP financial News At 11:10 a.m. EST Thursday, Feb. 1, 1996, Feb. 1, 1996, pp. 107–110.

AP Online, AP Financial News At 3:10 p.m. EST Thursday, Feb. 1, 1996, Feb. 1, 1996, pp. 98–102.

AP Online, AP Financial News At 5:10 p.m. EST Thursday, Feb. 1, 1996, Feb. 1, 1996, pp. 103–106.

AP Online, AP Financial News At 5:20 p.m. EST Thursday, Feb. 1, 1996, Feb. 1, 1996, pp. 111–114.

AP Online, Amer Express Backs Rival Ides, Feb. 29, 1996, pp. 428–429.

AP Worldstream, Financial Pages, Feb. 1, 1996, pp. 128–129.

AP Worldstream, Financial Pages, Feb. 29, 1996, pp. 430–432.

AP Worldstream, A Summary of News From the U.S. Virgin Islands, May 25, 1995, pp. 265–268.

Asia, Inc., Internet Security, May 1996, pp. 64–66.

Asia, Inc., Internet Security, May 1996, pp. 67–69.

Asian Banker, Shopping On the Internet, Mar. 1996, pp. 384–388.

Asian Wall Street Journal, Fraud, Nosy Web Pages Torment Internet Users, Mar. 18, 1996, p. 320.

Asiaweek, Protocols, Cyber Security; How to Head Off the Hackers, Feb. 23, 1996, pp. 489–490.

Associated Press, Cable's Sci–Fi Channel Creates World Wide Web 'Home Page', Jun. 9, 1995, pp. 262–264.

Associated Press, Visa and MasterCard Lead Group to Make Credit Purchases Safe On the Net, Jan. 31, 1996, pp. 173–174.

Associated Press, Visa, MasterCard Resolve Technical Differences For On–Line Credit Transactions, Feb. 1, 1996, pp. 130–131.

Associated Press, American Express Endorses Rivals' Ideal for Secure Online Credit, Feb. 29, 1996, pp. 433–434.

Associated Press, American–Express Endorses Rivals' Idea For Secure Online Credit, Mar. 1, 1996, pp. 389–390.

Austin American–Statesman, Standard Proposed For Electronic Verification, Jul. 3, 1995, pp. 251–252.

Austin American–Statesman, Credit Cards To GFet Internet Security; Visa, MasterCard Have Agreed On a Way to Scramble Card Numbers, Feb. 2, 1996, pp. 45–46.

Baltimore Sun, Sun Names former Reporter to lead Move Into Internet; Service Will offer News and Advertising, Jan. 31, 1996, pp. 175–176.

Banker, Banks Take Charge, Mar. 1996, pp. 396–399.

Banker, Product, Mar. 1996, pp. 400–403.

Banker, Technology, Banks Take Charge, Mar. 1996, pp. 391–394.

Banker, Visa and MasterCard Join Forces to Develop Standards, Mar. 1996, p. 395.

Banker, Credit Card Standards, Apr. 1996, p. 239.

Banking Policy Report, Visa and MasterCard Move to Safeguard Card Transactions on Internet, Mar. 4–18, 1996, pp. 370–371.

Bank Systems & Technology, First Union, Open Market Hit the Internet, May 1995, pp. 269–270.

Black Sun Interactive, 3D PointWorld, Downloading, PointWorld, Apr. 16, 1996, p. 1.

Business Journal–Portland, Taking the Plunge Into On–Line Sales, Feb. 9, 1996, pp. 2–4.

Business Times, SNS Online Service Confident of Success, Nov. 27, 1995, pp. 184–186.

Business Times, Opening Windows to Net Security, Mar. 6, 1996, pp. 362–363.

Business Times, Card, IT Leaders Make Shopping On the Net Safer, Apr. 2, 1996, p. 236.

Business Wire, MasterCard International Goes Live On the Internet; New MasterCard World Wide Web Site Home Page Combines Utility and Imagination, Mar. 27, 1995, pp. 294–296.

Business Wire, Adobe and Netscape to Bring Commercial Publishing to the Internet, Mar. 28, 1995, pp. 291–293.

Business Wire, Emerging U.S. Debit Market Attracts International Player Jul. 27, 1995, pp. 244–245.

Business Wire, VeriSign Inc. to Provide Digital IDs for Open Market's Secure WebServer; Key Technology for Verifying the Identities of Parties in Electronic Commerce, Aug. 14, 1995, pp. 241–243.

Business Wire, ComNet '96 Explores Electronic Commerce; Business On the Internet the Focus of Many Conference Sessions, Jan. 4, 1996, pp. 181–183.

Business Wire, "Computer Within a Floppy Disk" Puts Secure Electronic Commerce In the Palm of Your Hand, Jan. 17, 1996, pp. 179–180.

Business Wire, RSA Data Security, Inc. Establishes Japanese Subsidiary Company to Market RSA Encryption Technology to Developers in Japan, Feb. 8, 1996, pp. 7–8.

Business Wire, VeriSign to Provide Digital ID Services for FTP Software's Esplanade (TM) Web Server for Windows NT; Alliance Will Ensure Secure Electronic Transactions for Users of New Web Servers, Feb. 12, 1996, pp. 538–540.

Business Wire, First Data and Netscape Offering Internet Payment Processing Service; New Service Available Now, Feb. 20, 1996, pp. 500–501.

Business Wire, RSA Announces Support for SET Payment Standard Across Entire Product Line; World's Most Popular Encryption Solution Provider Now Supports Visa/MasterCard Standard for Secure Payments Over the Internet, Mar. 4, 1996, pp. 372–373.

Business Wire, Certicom—Special Task Group to Review Secure Electronic Transaction Protocol Developed by Visa and MasterCard—Sherry E. Shannon Appointed Chair of the New Task Group, Mar. 15, 1996, pp. 340–341.

Business Wire, Panel of Electronic Commerce Experts to Reveal "What Gates and McNealy Won't Tell You About Electronic Commerce"—ICat Corp. Convenes Panel of Pioneers to Discuss the Hype and Reality at New York Trade Show, Mar. 26, 1996, pp. 289–290.

Business Wire, Major Flaws Seen in Visa/MasterCard Security Plan for Internet Commerce; Network Security Expert Says RSA Encryption and Authentication Standard Leaves Consumers Vulnerable to Hackers, Apr. 16, 1996, pp. 154–155.

Business Wire, ICVerify to Incorporate SET Specification in its Software Solutions; SET Specification Provides Long Awaited Internet Security for Both Customers and Merchants, Apr. 26, 1996, pp. 125–126.

Business Wire, John Gould Joins Terisa Systems As Chief Executive Officer, Apr. 29, 1996, pp. 102–103.

Business Wire, IBM Leads Industry With Comprehensive Strategy, Technologies for Electronic Commerce; Electronic Shopping, Secure Transactions, May 1, 1996, pp. 70–75.

Business Wire, L.L. Bean Signs Up With IBM; IBM Announces New Products, Services tha Make Internet Real for Business, May 1, 1996, pp. 76–80.

Business Wire, Electronic Commerce Just Got Real; NETCOM, Federal Express, Open Market and CheckFree Join iCat to Discuss Breakthrough Electronic Commerce Solution, May 2, 1996, pp. 59–61.

Calgary Herald, Visa and MasterCard Agree On Standard, Feb. 2, 1996, pp. 54–55.

Calgary Herald, 'Net Security Hinders Commerce, Apr. 4, 1996, pp. 228–229.

Canada Newswire, Attention Business/Technology Editors: Special Task Group to Review Secure Electronic Transaction Protocol Developed by Visa and MasterCard, Mar. 15, 1996, pp. 342–343.

CardFAX, A Joint Technical Standard for Security Credit Card Transactions Over the Internet, Feb. 2, 1996, p. 56.

Card News, Security Advances May Improve, Not Perfect, On–Line Transactions, Feb. 5, 1996, pp. 28–30.

Card News, Amex, First Data Initiate On–Line Purchase Efforts, Mar. 4, 1996, pp. 374–375.

Card News, Card News Briefs: Discovery Joins Security Rush, Apr. 1, 1996, p. 240.

Card News, Card on the Web Addressed, Apr. 29, 1996, pp. 104–105.

Cards International, VeriSign Secures Net Deals, Jul. 20, 1995, pp. 246–247.

Cards International, International: MC and Visa Co–Operate On Internet Specs, Feb. 14, 1996, 530–531.

Cards International, Amex Set to Suppprt Security Specs, Mar. 12, 1996, pp. 356–357.

Charleston Gazette, Secure Internet Credit Code Unveiled, Feb. 2, 1996, pp. 57–59.

U.P.I., Checkfree Partnering With Cybercash, Jul. 19, 1995, p. 248.

Chicago Sun–Times, Visa, MasterCard Agree On Online Security, Feb. 2, 1996, pp. 60–61.

Christian Science Monitor, Visa, MasterCard Tackle Internet Security, Feb. 2, 1996, p. 80.

Columbus Dispatch, Roving Bandits Make Buying Risky Business, Nov. 6, 1994, pp. 312–313.

COMLINE Daily News from Korea, MasterCard, Visa Agree to a Single Security Standard, Feb. 7, 1996, p. 11.

Communications News, Business Banks Its Future On Electronic Commerce; Strategies Being Pursued for Secure Financial Transactions on the Internet; Netcom Update; Industry Trend or EventCom, Apr. 1996, pp. 241–243.

CommunicationsWeek, MCI Offers Secure Transaction Service, Oct. 2, 1995, pp. 229–230.

CommunicationsWeek, In Brief; Charge It On the 'Net, Feb. 5, 1996, p. 31.

CommunicationsWeek, On–Line Payment Scheme Arrives, Feb. 26, 1996, pp. 456–458.

CommunicationsWeek, In Brief; Amex 'Set' For Internet, Mar. 4, 1996, p. 376.

CommunicationsWeek, Safety On the 'Net—Can Encryption Offer Peace of Mind to Nervous Network Managers, Mar. 25, 1996, pp. 299–303.

CommunicationsWeek, Tandem, VLSI Partner to Develop Security Chips for Commercial Use, Apr. 15, 1996, pp. 166–167.

CommunicationsWeek, Shop Till You Drop With the JEPI Standard, Apr. 22, 1996, pp. 134–135.

CommunicationsWeek, Terisa, to Add SET to Web Software, Apr. 29, 1996, pp. 106–107.

CommunicationsWeek, Netscape Adds Electronic–Commerce Apps, May 13, 1996, pp. 10–11.

CommunicationsWeek, Internet Security—A Moving Target, May 13, 1996, pp. 12–15.

Computer Conference Analysis Newsletter, UniForum; Conference On Unix and Open Systems With Focus On the Internet; Industry Trend or Event, Feb. 26, 1996, pp. 459–479.

Computer Connection, Telecomm Decency Act Draws Cheers, Jeers and Fears, Feb. 10, 1996, pp. 549–557.

Computer Connection, Internet Security Standards Agreement, Feb. 10, 1996, pp. 558–559.

Computergram International, Microsoft Confounded: Visa–MasterCard Spec Free, Feb. 2, 1996, p. 62.

Computergram International, First Data, Netscape Jointly Deliver First Real–Time On–Line Credit, Apr. 11, 1996, p. 223.

Computer Reseller News, Terisa Systems Enters Channel With Security Products, Apr. 22, 1996, pp. 136–137.

Computer Shopper, AT&T Offers Low–Tech Protection for Internet: No–Deductible Insurance for Online Buyers, May, 1996, pp. 81–82.

Computer Technology Review, Digital Signatures Keep Cyberstreets Safe for Shoppers, Feb. 1996, pp. 132–134.

Computer Weekly, Web Takes the Credit; Visa, MasterCard Join Forces to Develop Secure Payment Systems for Electronic Commerce; Company Business and Marketing, Feb. 8, 1996, pp. 9–10.

Computerworld, News Shorts, Feb. 5, 1996, pp. 32–33.

Computerworld, Microsoft Provides Rapid Net Deployment Ability, Mar. 18, 1996, pp. 321–323.

Computerworld, Briefs, Mar. 18, 1996, p. 324.

Computerworld, Predictions, Apr. 29, 1996, pp. 108–110.

Computerworld, Credit–Card Authorization Set For Net, May 13, 1996, pp. 16–17.

Corporate EFT Report, MasterCard, Visa to Combine Internet Security Standards, Feb. 7, 1996, pp. 12–13.

Corporate EFT Report, Products Could Spur On–Line Transactions, Mar. 6, 1996, pp. 364–365.

Corporate EFT Report, Amex Eyes Internet Security, Mar. 6, 1996, p. 366.

Corporate EFT Report, Corporate EFT Report News Briefs, Apr. 3, 1996, pp. 230–231.

Credit Card Management, Internet Commerce Gets A Boost, Mar. 1996, pp. 404–405.

Credit Card News, Electronic Commerce Gets a Boost, Feb. 15, 1996, pp. 526–527.

Daily Mail, Now Spending Cuts Are On the Cards; Money Mail, Feb. 7, 1996, pp. 14–15.

Daily Telegraph, Card Guard Makes It Safer to Cybershop, Feb. 2, 1996, p. 63.

Daily Telegraph, Innovations: Codes to Beat the Criminal Internet, Feb. 13, 1996, pp. 534–535.

Datamation, Microsoft Plays Internet Catch–U. Microsoft & the Enterprise: I–Nets; Company Business and Marketing; Cover Story, Mar. 15, 1996, pp. 344–348.

Des Moines Register, Safe Shopping On–Line; Card Associations Agree On Internet Security, Feb. 17, 1996, pp. 520–522.

Digital Media, Turning the Page; MCI Switches From News Corp to the Microsoft Network; Letter; Company Business and Marketing Column, Mar. 12, 1996, pp. 358–360.

Discount Merchandiser, Secure Electronic Transactions, Mar. 1996, pp. 406–407.

DM News, Open Market Offers Internet Security; Clients Can Get On the World Wide Web For Less Than $1,000, Apr. 3, 1995, pp. 281–282.

DM News, Mainstream Alternative For Advertisers; Business Wants to be Visible; Cybercitizens Want to Buy, Feb. 12, 1996, pp. 543–545.

DM News, Canadian Big Guns Set Sights On Skittish Cybershoppers; St. Remy Multimedia, Cogco Cable in Quadruple Play, Feb. 19, 1996, pp. 506–508.

DM News, IBM's Commercial Online Service Will Build DBs, Track Spending, Feb. 19, 1996, pp. 509–510.

Denver Post, On–Line Car Dealer Rings Up 57 Sales In Four Months, Feb. 10, 1995, pp. 299–300.

dot.COM, Internet Data's Payment Service, Mar. 1, 1996, p. 408.

Edge: Work–Group Computing Report, Digital ID: Verisign Inc. To Provide Digital IDS For Open Market's Secure Webserver; Key Technology For Verifying the Identifies of Parties In Electronic Commerce, Aug. 21, 1995, pp. 236–237.

Edge: Work–Group Computing Report, E–Commerce: IBM Leads Industry With Comprehensive Strategy, Technologies for Electronic Commerce; Electronic Shopping, Secure Transactions, May 6, 1996, pp. 48–52.

EDI News, MasterCard, Visa To Combine Internet Security Standards, Feb. 19, 1996, pp. 511–512.

EDP Weekly, Visa, MasterCard Announce Single Technical Standard To Safeguard Payment Card Purchases on Internet, Feb. 12, 1996, p. 546.

EDP Weekly, American Express To License Microsoft Software To Help Secure Transactions Via Internet, Mar. 11, 1996, p. 361.

EDP Weekly, ANSI Committee Creates Special Task Group To Review Secure Electronic Transaction Protocol, Mar. 25, 1996, p. 304.

EDP Weekly, Network Security Expert Notes Major Flaws in Visa/MasterCard Security Plan, Apr. 22, 1996, p. 140.

EFT Report, Service Variety Seen Key to Home Banking's Future, Mar. 29, 1995, pp. 288–290.

EFT Report, MasterCard, Visa To Combine Internet Security Standards, Feb. 14, 1996, pp. 532–533.

Electronic Buyers' News, EC Providers Take On Security— Visa, MC Announce Transaction Standard; GE Intros B–to–B Solution, Feb. 12, 1996, pp. 547–548.

Electronic Buyers' News, SET Controversy Flares Up—Insiders Debate Integrity Of Proposed Standard, Apr. 29, 1996, pp. 113–115.

Electronic Engineering Times, Credit–Card Firms Agree On Security, Feb. 5, 1996, p. 34.

Electronic Engineering Times, E–Cash Coming? Bank On It, Feb. 19, 1996, pp. 513–516.

Electronic Engineering Times, Secure Internet Transactions Seen, Feb. 26, 1996, pp. 480–481.

Electronic Engineering Times, Copyright Protection Moves Into Digital Age, Mar. 18, 1996, pp. 325–327.

Electronic Engineering Times, Form Factors Figures Into Security Debate, Apr. 29, 1996, pp. 111–112.

Electronic Marketplace Report, Visa, MasterCard Announce Standard For Securing Internet Transactions, Feb. 6, 1996, pp. 17–18.

Electronic Messaging News, Visa, MasterCard Combine Standards, Feb. 7, 1996, p. 16.

Electronic Messaging News, MasterCard, Visa In Internet Pact, Feb. 26, 1996, p. 482.

Electronic Payments International, Ingenico Buys Innovatron Data Systems, Mar. 1996, pp. 409–410.

Electronic Payments International, Getting All SET For On–Line Commerce, Mar. 1996, pp. 411–412.

Electronic Payments International, The Growing Impact of the Internet, Mar. 1996, pp. 413–415.

Electronic Payments International, Telefonica Makes the Right Calls Before SET, Apr. 1996, pp. 244–245, 248–249.

Electronic Payments International, Consortium Explores Internet Payments, Apr. 1996, pp. 246–247, 250–251.

Exchange, Novell Expands Networked Application and Electronic Commerce Offerings, Mar. 22, 1996, pp. 315–316.

Extel Examiner, Microsoft, American Express Unit Sign Internet Payment System, Feb. 29, 1996, p. 435.

FDCH Political Transcripts, The National Consumers League Holds a News Conference on Combatting Fraud on the Internet; Washington, D.C., Feb. 27, 1996, pp. 446–455.
Federal Document Clearing House Congressional Testimony, Testimony October 17, 1995 Eugene Ludwig Comptroller Office of the Comptroller of the Currency House Banking Financial Institutions and Consumer Credit Bank Consolidation and Interstate Mega–Mergers, Oct. 17, 1995, pp. 214–226.
Federal News Service, Prepared Testimony of Eugene A. Ludwig Controller of the Currency Before the House Committee on Banking and Financial Services Subcommittee on Financial Institutions, Oct. 17, 1995, pp. 195–205.
Federal News Service, Prepared Statement of Joel S. Lisker Senior Vice President, Security and Risk Management Mastercard International Incorporated Before the House Committee on Banking and Financial Services, Apr. 15, 1996, pp. 168–172.
Federal News Service, Hearing of the House Banking and Financial Services Committee, Apr. 15, 1996, pp. 173–216.
Financial Post, Reaching Out on the Electronic Highway, Mar. 14, 1996, pp. 353–355.
Financial Post, Race on to Come Up With Web Payment System, Apr. 27, 1996, pp. 122–124.
Financial Times, Credit Card Groups to Co–Operate on Internet Security, Feb. 2, 1996, p. 64.
Fresno Bee, Credit Firms Set Internet Security Code, Feb. 2, 1996, p. 65.
Gazette (Montreal), Digital Sermon Packs 'Em In: 1,100 From Business World listen Raptly to Technoguru's Generalities, Apr. 18, 1996, pp. 149–151.
Gazette (Montreal), Bell Global Has High Hopes for Business Network, Apr. 19, 1996, pp. 147–148.
Houston Chronicle, Firms Back Cyberspace Verification System, Jun. 26, 1995, pp. 253–256.
Independent, In Brief: Amex and Microsoft Sign Internet Deal, Mar. 1, 1996, p. 416.
Industry Week, Move Over China, Caught In the Web, May 1, 1995, p. 271.
Information & Interactive Services Report, Microsoft, Wal–Mart Pact Aims for Online Bargain–Hunters, Feb. 23, 1996, pp. 491–492.
InformationWeek, Intranet Tools, E–Mail on the Net to Debut—Major Announcements Expected at Internet World, Electronic Messaging Association Conferences, Apr. 22, 1996, pp. 142–143.
InformationWeek, Cisco Places $4 Billion Network Bet—StrataCom Buy Seen Extending ATM, Tying Switching and Routing, Apr. 29, 1996, pp. 116–117.
InformationWeek, Netscape's Corporate Push Grows—CompuServe Tie–In Puts Groupware on Internet, May 13, 1996, p. 27.
InformationWeek, In Short; Terisa Names CEO, May 13, 1996, p. 29.
InfoWorld, National Semiconductor's PersonaCard; Card Holds Key to On–Line Security, Nov. 14, 1994, pp. 310–311.
InfoWorld, Standards; Adapt or Die: Internet Standards May Always Be In Flux, Nov. 6, 1995, pp. 187–192.
InfoWorld, At Deadline, Feb. 5, 1996, pp. 35–36.
InfoWorld, RSA Sale May Improve Security, Apr. 22, 1996, p. 144.
InfoWorld, Pipeline, Apr. 22, 1996, p. 145.
InfoWorld, Internet Servers; Netscape Antes Up for Commerce, May 13, 1996, pp. 30–31.
InfoWorld, IBM, HP Preview 'Net products Aimed On–Line Commerce, May 13, 1996, p. 33.
InfoWorld, Web Page Authoring Tool; Internet Creator Builds Sites One Paragraph at a Time; No Need to Master HTML; Tool Enables On–Line Commerce, May 13, 1996, pp. 35–37.
InformationWeek, Europe, Oct. 2, 1995, pp. 231–234.
Interactive Daily, 4. Cyberspace Security Bolstered by Pact, Feb. 2, 1996, p. 68.
Interactive Daily, 5. Microsoft Allies With American Express, Mar. 1, 1996, p. 417.
Interactive Marketing News, Mastercard and Visa Reach Agreement on Security Protocols, Feb. 16, 1996, pp. 523–524.
International Herald Tribune, A Giant Leap for Credit Cards? System to Protect Payments on Internet is Unveiled, Feb. 2, 1996, pp. 66–67.
Investor's Business Daily, The Electronic Wallet: Secure Payment Methods Sought for Internet, Dec. 8, 1994, pp. 305–307.
Investor's Business Daily, CEO Briefing; A4, Mar. 28, 1996, pp. 285–286.
Korea Economic Daily, Mastercard, Visa Agree to a Single Security Standard, Feb. 6, 1996, p. 19.
Los Angeles Times, The Cutting Edge: Special Report/Hot Tips; What's Coming, When, and Whey It's a Big Deal; Next Year Could Bring Start Of On–Line Profits, Dec. 18, 1994, pp. 303–304.
Los Angeles Times, Technology, Feb. 1, 1996, p. 139.
M2 Presswire, Adobe and Netscape to bring Commercial Publishing to the Internet (C) 1994–95 M2 Communications LTD, Mar. 31, 1995, pp. 283–285.
M2 Presswire, Verisign, Inc: VeriSign Inc to Provide Digital IDs for Open Market's Secure WebServer, Aug. 16, 1995, pp. 238–240.
M2 Presswire, Rednet: EDI for the Apple Macintosh and Power PC, Oct. 24, 1995, pp. 193–194.
M2 Presswire, Visa Intl: Security Specifications for Card Transactions on Internet Combined into One Standard, Feb. 1, 1996, pp. 140–141.
M2 Presswire, First Data: FD and Netscape Offering Internet Payment Processing Service New Service Available Now, Feb. 21, 1996, pp. 495–496.
M2 Presswire, Visa: Visa and MasterCard Welcome American Express to Their Internet Payment System, Mar. 1, 1996, pp. 418–419.
M2 Presswire, Credit Card Research Group: Cards to Make a Clean Sweep of the Cybermarket, Mar. 1, 1996, pp. 420–421.
M2 Presswire, Racal Airtech: Racal Supports the Visa/MasterCard Secure Electronics Transactions, (SET) Specification, May 2, 1996, pp. 62–63.
Media Daily, Microsoft, Visa Announce Specification to Secure Payments, Sep. 27, 1995, p. 235.
Media Daily, Mastercard and Visa Agree on Online Security Standard, Feb. 1, 1996, p. 136.
Media Daily, Netscape Launches Payment System, May 13, 1996, p. 38.
Report on Microsoft, News Briefs: Visa and Mastercard, Apr. 22, 1996, p. 146.
Midrange Systems, GEIS Aims to Stimulate EDI Growth, Mar. 15, 1996, pp. 349–350.
Milwaukee Journal Sentinel, U.S. Postal Service to Enter Electronic Age, Mar. 4, 1996, pp. 379–380.

Multimedia & Videodisc Monitor, Tools & Technology: Mastercard, Visa Agree on Encryption Technology, Mar. 1, 1996, p. 422.
Multimedia Week, Industry Briefs: Encryption, Feb. 5, 1996, p. 39.
Nation's Restaurant News, Amex, Microsoft Seal Security Agreement. American Express Travel Related Services Co. Signs Licensing Agreement With Microsoft Corp.; Brief Article, Mar. 18, 1996, p. 328.
Nave Research Group, Navigating and Acting in Virtual Environments, May 16, 1996, pp. 1–9.
Network Briefing, Visa & Mastercard Agree E–Payment Spec, Feb. 16, 1996, p. 525.
Network Computing, More Than One Way to Skin a Coded Cat, Mar. 15, 1996, p. 351.
Network World, Wells Fargo Hops Aboard 'Net Wagon, Feb. 6, 1995, pp. 301–302.
Network World, An Insecure Feeling Haunts the 'Net, Feb. 12, 1996, pp. 541–542.
Network World, Wal–Mart to Lure Electronic Shoppers With Web Retail Store, Feb. 19, 1996, pp. 504–505.
Network World, News Briefs, Mar. 4, 1996, pp. 377–378.
Network World, Security Specification Is Full of Holes, Critics Charge, Apr. 22, 1996, pp. 138–139.
Network World, Ready, SET, Go; American Express, MasterCard, and Visa Throw Their Combined Weight Behind the SET Payment Protocol for the Web; Merchants May Face a Learning Curve, May 13, 1996, pp. 18–23.
Network World, Effort Aims to Unite 'Net Payment Schemes, May 13, 1996, p. 24.
Network World, Netscape Unveils New 'Net Commerce Offerings, May 13, 1996, pp. 25–26.
News, Credit Card Fraud New Concern of Internet Business, Mar. 16, 1996, pp. 329–330.
Newsbytes News Network, France—Bull Forms Smart Card Subsidiary, Apr. 13, 1995, pp. 274–275.
Newsbytes News Network, Open Market Intros "Secure" Web Storefront, Oct. 17, 1995, pp. 206–207.
Newsbytes News Network, Newsbytes Daily Summary, Oct. 17, 1995, pp. 208–213.
Newsbytes News Network, Commerce Direct Offers Secure Electronic Transactions, Jan. 22, 1996, pp. 177–178.
Newsbytes News Network, ****Visa, Mastercard Combine Internet Security Standards, Feb. 2, 1996, pp. 71–72.
Newsbytes News Network, GTE's CyberTrust For Web Electronic Commerce, Feb. 6, 1996, pp. 20–21.
Newsbytes News Network, AT&T WorldNet Spurs Online Credit Use, Feb. 6, 1996, pp. 22–23.
Newsbytes News Network, Open Market, Interleaf Team On Web "Secure Doc Mgt", Mar. 5, 1996, pp. 367–369.
Newsbytes, Web Marketplace—Online Security Agreement Almost Here, Apr. 10, 1996, pp. 224–225.
News Tribune, Business Briefly, Feb. 2, 1996, pp. 69–70.
New York Times, A New Standard is Proposed for Electronic Verification, Jun. 26, 1995, pp. 257–258.
New York Times, Plan to Guard Credit Safety on Internet, Feb. 1, 1996, pp. 142–143.
New York Times, Jan. 28—Feb. 3; Attention, Cyber–Shoppers!, Feb. 4, 1996, p. 40.
New York Times, Diary, Feb. 4, 1996, pp. 41–43.
Nightly Business Report, Feb. 1, 1996, pp. 144–154.
Nightly Business Report, Feb. 1, 1996, pp. 150–154.
Orange County Register, Life on the Line; Credit Where Credit is Due, Mar. 31, 1996, pp. 283–284.
Orange County Register, Bits and Pieces, Apr. 7, 1996, pp. 226–227.
PC Magazine, MasterCard and Visa Join Forces for Net Commerce; To Develop the Secure Electronic Transactions Technical Standard for Protecting Credit Card Purchases Made Over the Internet; Technology Information; Brief Article, Mar. 26, 1996, pp. 291–292, 295–296.
PC Magazine, Skinny Client to Rule on Web; Corporate Intranets Will Fuel a New Breed of Applications; Industry Trend or Event; Brief Article, Mar. 26, 1996, pp. 293–294, 197–298.
PC Magazine, Digital Bucks? Stop Here; Electronic Commerce Services; The Web at War: The Battle for the Future of the Internet; Company Business and Marketing, May 28, 1996, pp. 2–5.
PC Magazines, Digital Bucks? Stop Here, May 28, 1996, pp. 6–9.
PC User, Shortlist; News Briefs, Feb. 21, 1996, pp. 497–499.
PC Week, Briefly Noted; News Briefs, Brief Article, Feb. 5, 1996, pp. 37–38.
PC Week, AT&T Ramps Up Internet Commerce, Access to WorldNet Service; Company Business and Marketing; Brief Article, Feb. 19, 1996, p. 517.
PC Week, Big Player; Deals to Speed Net Commerce; Netscape, Oracle, HP Cut Agreements for Credit–Card Systems, Security; Industry Trend or Event, Feb. 26, 1996, pp. 483–484.
PC Week, Microsoft Reposition MSN; Microsoft Network to Offer New Services; Online Service Information; Brief Article, Feb. 26, 1996, pp. 485–486.
PC Week, Microsoft Reposition MSN, Feb. 26, 1996, pp. 487–488.
PC Week, Briefly Noted; News Briefs; Brief Article, Mar. 4, 1996, p. 381.
PC Week, New Security Protocol Spurs Internet Took Kits; Secure Electronic Transaction, Industry Trend or Event, Apr. 15, 1996, pp. 217–218, 219–220.
PC Week, IBM Takes Charge of E–Commerce: Plans Client, Server Apps Based on SET; NetCommerce Electronic Commerce System; Product Announcement, Apr. 29, 1996, pp. 118–119.
PC Week, IBM Takes Charge of E–Commerce; Plans Client, Server Apps Based on SET, Apr. 29, 1996, pp. 120–121.
Portland Press Herald, L.L. Bean to Offer Ordering By Internet; It's a Bold Move for a Firm That's Usually Slow to Adopt New Technology, May 2, 1996, pp. 56–58.
PR Newswire, Bank One Joins Commercenet, Oct. 17, 1994, pp. 314–315.
PR Newswire, Rudolph Beware MCI to Offer Cyber–Santas a Faster Route to the Mall Via Mouse; MarketplaceMCI Opens Door to 25 Million New Customers; Integrated Software Package Assures Secure Electronic Transactions, Nov. 22, 1996, pp. 308–309.
PR Newswire, Microsoft Corp. Chooses Software.Net (TM) to be First to Electronically Deliver Microsoft Software; Software.Net to Electronically Market Over Microsoft Products Via the Internet, Oct. 17, 1995, pp. 227–228.
PR Newswire, Visa and MasterCard Combine Security Specifications for Card Transactions on the Internet into One Standard; Move Expected to Accelerate Development of Electronic Commerce and Bolster Consumer Confidence in the Security of Cyberspace Transactions, Feb. 1, 1996, pp. 155–156.

PR Newswire, SAIC is £Yourservice for Secure Electronic Transactions on the Internet, Feb. 29, 1996, pp. 436–437.
PR Newswire, American Express Signs Licensing Agreement With Microsoft to Make Secure Purchases Over the Internet, Feb. 29, 1996, pp. 438–439.
PR Newswire, Visa and Mastercard Welcome American Express, Feb. 29, 1996, pp. 440–441.
PR Newswire, Centura Announces the Next Step in Online Money Management, Apr. 15, 1996, pp. 221–222.
PR Newswire, Industry Security Leader Racal Supports Visa/Mastercard Proposal for Internet, Apr. 17, 1996, pp. 152–153.
PR Newswire, Spyglass(TM) Supports Microsoft's ACTIVEX, SET, PCT and ISAPI With Introduction of New Spyglass Web Technology Kits, Apr. 23, 1996, pp. 132–133.
PR Newswire, Cybersource's New Internet Commerce Services Provide Software Publishers Turn–Key Electronic Transaction and Distribution Services; Qualcomm, Insignia, Wall Data and Seven Other Publishers Choose CyberSource to Distribute Products Via the Internet, Apr. 30, 1996, pp. 99–101.
PR Newswire, 1996 Olympic Games Web Site Proves a Successful as Venue for Olympic Ticket Sales; IBM–Developed Server Enables Secure Electronic Transactions for a Large Number of Consumers, May 1, 1996, pp. 83–84.
PR Newswire, Dynamic Duo Taxware and IBM; Partners on the Commerce.Net, May 1, 1996, pp. 85–86.
PR Newswire, DocuMagix Hotpage Available Now Online Via Software.Net; Software.Net Offers DocuMagix HotPage with Exclusive Custom Content, May 7, 1996, pp. 44–45.
PR Newswire, Netscape Announces Netscape Livepayment (TM) to Facilitate Internet Commerce; Leading Companies to Support Netscape's Open, Cross–Platform Softweare for Online Credit Card Processing, May 13, 1996, pp. 39–41.
Record, Security is Going on Line; Mastercard, Visa Agree on Standard, Feb. 2, 1996, pp. 73–75.
Reuters, Bank One Corp <One.N> Says Joins Commercenet, Oct. 17, 1994, p. 316.
Reuters, MasterCard, Visa to Set Electronic Standard NYT, Feb. 1, 1996, p. 160.
Reuters, Visa and Mastercard Adopt Joint Internet Standard, Feb. 1, 1996, pp. 164–165.
Reuters, GE<GE.N> Info Services Debuts net Commerce System, Feb. 6, 1996, pp. 24–25.
Reuters, AMEX <AXP.N>, Microsoft <MSFT.O> In Pact, Feb. 29, 1996, p. 442.
Reuters, Netscape<NSCP.O> Offers Secure Internet Collection, May 13, 1996, p. 42.
Reuter Business Report, America Online, Others Push for Net Security, Apr. 11, 1995, pp. 276–277.
Reuter Business Report, Visa and Mastercard Adopt Joint Internet Standard, Feb. 1, 1996, pp. 158–159.
Reuter Business Report, Mastercard, Visa to Set Electronic Standard NYT, Feb. 1, 1996, p. 157.
Reuter Business Report, Improving Internet Safety to Protect Commerce, Apr. 3, 1996, pp. 232–234.
Reuter European Business Report, America Online, Others Push for Net Security, Apr. 11, 1995, pp. 278–279.
Reuter European Business Report, Mastercard, Visa to Set Electronic Standard—NYT, Feb. 1, 1996, p. 161.
Reuter European Business Report, Visa and Mastercard Adopt Joint Internet Standard, Feb. 1, 1996, pp. 162–163.
Reuters World Service, MasterCard, Visa to Set Electronic Standard—NYT, Feb. 1, 1996, p. 169.
Risk Management, Are You Exposed on the Internet? Security Issues and Data Protection; Circuit Breakers, Apr. 1996, pp. 252–254.
Rocky Mountain News, Visa, MasterCard Agree on 'Net Security; Deal Allows to Offer Customers Greater Protection in On Line Services, Feb. 2, 1996, pp. 76–77.
Rocky Mountain News, The Web: It's Anybody's Business; Colorado Retailers and Service Companies Caught Up in Awesome Potential of Internet, Mar. 24, 1996, pp. 305–310.
Sacramento Bee, Credit Card Standard Set for Net, Feb. 23, 1996, pp. 78–79.
The San Diego Union–Tribune, Business; Ed. 1,2,3,4,5,6,7,8; p. C–2, Mar. 1. 1996, pp. 423–424.
The San Francisco Chronicle, Mastercard, Visa Accord on Internet Credit–Card Giants Agree on a Security Standard, Feb. 1, 1996, pp. 137–138.
The San Francisco Examiner, Credit–Card Companies OK Internet Security Deal, Feb. 1, 1996, pp. 166–167.
The San Francisco Examiner, Infobahn leads to a Volvo Dealer, Mar. 1, 1996, pp. 297–298.
Seybold Report on Desktop Punlicshjing, Visa, MasterCard Adopt SET, Feb. 19, 1996, pp. 518–519.
South China Morning Post, Business; Banking; p. 7, Mar. 30, 1995, pp. 286–287.
Standard & Poor's Emerging & Special Situation, New Issues—Cybercash Avoid, Feb. 20, 1996, pp. 502–503.
The Straits Times (Singapore), Larger NetworkAsia Show This Year, Apr. 25, 1995, pp. 272–273.
The Straits Times (Singapore), Credit Card Firms Devise Joint Net Payment Scheme, Feb. 2, 1996, p. 81.
The Straits Times (Singapore), Music Scene Alive and Thriving Since the '30s, Feb. 6, 1996, pp. 26–27.
The Straits Times (Singapore), Concern Grows Over Credit Card Debts, Mar. 24, 1996, pp. 311–314.
Sunday Times, Credit Card Set Standard for Net Buys, Feb. 4, 1996, p. 44.
Telecomworldwire, Global Players Unite on Payment Standards, Feb. 1, 1996, p. 168.
Telecomworldwire, Sidewire: Science Applications International Corp, a US Provider of Information and Network, Mar. 1, 1996, p. 425.
Telecomworldwire, Adobe, Netscape Form Major Commercial Internet Publishing Plan, Apr. 4, 1995, p. 280.
The Toronto Star, Firm Unveils Secure Net Paying System, Mar. 27, 1996, pp. 287–288.
Origin Universal New Services Limited, Racal Supports the Visa/Mastercard Secure Electronics Transactions (SET), May 1, 1996, pp. 87–88.
Upside, The Cyber Bowl, Apr. 1996, pp. 255–266.
Upside, The Key to Security, Apr. 1996, pp. 267–276.
Upside, End of the Line for On–Line Services?, May 1996, pp. 89–98.
U.S. Banker, Card Pact Weaves A Tighter Net, Mar. 1996, p. 426.
Wall Street Journal, Visa, Mastercard Reach an Agreement for Single System of Internet Payment, Feb. 1, 1996, p. 170.
The Washington Post, Feb. 2, 1996, pp. 83–84.
The Washington Post, Give Us Some Credit: Your Card is Safe; There Are Many Very Good Reasons Not to Shop On–Line. Fear That Your Credit Card Number Will be Abused Should Not Be One of Them, Apr. 24, 1996.
The Washington Post, Who Was That Masked Cybershopper?; MasterCard–Visa Agreement on Credit Card Security May Make On–Line Commerce Fly, Feb. 2, 1996, p. 82.

Working Woman, Adventure On–Line . . . ; Using Online Services to Make Travel Arrangements, Apr. 1996, pp. 277–282.

Your Money, Brokers Not Equal When It Comes to Charging Customers, Mar. 16, 1996, pp. 331–337.

Your Money, Credit Card Fraud New Concern of Internet Business, Mar. 16, 1996, pp. 338–339.

Borenstein et al., MIME (Multipurpose Internet Mail Extensions) Part One: Mechanisms for Specifying and Describing the Format of Internet Message Bodies, Borenstein & Freed, Sep. 1993.

Fielding et al., Hypertext Transfer Protocol—HTTP/1.1, Fielding, Frystyk, Berners–Lee, Gettys and Mogul, May 2, 1996, Jun. 3, 1996.

An RSA Laboratories Technical Note, Version 1.5, Revised Nov. 1, 1993.

Internet Protocol, DARPA Internet Program Protocol Specification, University of Southern California, Sep. 1981.

Transmission Control Protocol, DARPA Internet Program Protocol Specification, University of Southern California, Sep. 1981.

| Name | Size | Remarks |
|---|---|---|
| Header | 2 bytes | Has the value 0xAA (MSB), 0x55(LSB) |
| Packet Type/ Byte Count | 2 bytes | The Packet Type is contained in the most 4 significant bits, b15 - b12. This determines if it is a test packet, control packet, or data (command or response) packet.:<br>Control Packet<br>• ACK<br>• NAK<br>Data (Command or Response) Packet<br>• More Blocks to follow<br>• Last Block<br>• Data Encrypted / Non-encrypted<br>Test Packet<br>• Server Initiated Test Mode, loopback<br><br>The Byte Count is contained in the remaining 12 bits, b11 - b0 (4095 max value), the size of the Sequence # and Data Block. |
| Header CRC | 2 bytes | Checksum of the Packet Type/Byte Count. For ACK and NAK packets, this is the last transmitted data. |
| Sequence # | 1 byte | Optional field, valid only for non-ACK/NAK packets. Start block is always 0, subsequent blocks will be incremented by 1. |
| Data Block | Byte Count - 1 | Optional field, valid only for non-ACK/NAK packets. The Command or Response Message may be broken up into smaller packets (blocks), and may further be encrypted. |
| CRC-16 | 2 bytes | 2 byte CRC calculation, from Sequence # to the last byte of the Data Block field. It is the standard 16-bit CRC-CCITT algorithm:<br>$G(x) = x^{16} + x^{12} + x^5 + 1$ |

FIGURE 11

| Name | Size | Remarks |
|---|---|---|
| Length | 1 byte | Length of data to follow. (For Block Symmetric Encoding.) |
| SubDevice Type | 1 byte | Selects the subdevice: System, Display, Keypad, and ICC. |
| Command | 1 byte | Command byte is Device Type dependent |
| Parameters | <variable> | This field is Command and Device Type dependent.<br>For Command Message: command data parameters.<br>For Response Message: 1 byte status, followed by requested data, if any. |

FIGURE 12

| Command | Description | Data Parameters |
|---|---|---|
| 0 | Store text string into NV memory. | Table, offset, string. |
| 1 | Display raw text. | String, column. |
| 2 | Display preset prompt from NV memory. | Table, offset, column. |
| 3 | Set local echo. | None. |
| 4 | Clear local echo. | None. |
| 5 | Set secure echo (display '*'). | None. |
| 6 | Clear secure echo. | None. |

FIGURE 13

| Status | Description |
|---|---|
| 0 | Successful operation. |
| 1 | Invalid command. |
| 2 | Too many characters. |
| 3 | Illegal prompt selection. |

FIGURE 14

SERVER FOR STARTING CLIENT APPLICATION ON CLIENT IF CLIENT IS NETWORK TERMINAL AND INITIATING CLIENT APPLICATION ON SERVER IF CLIENT IS NON NETWORK TERMINAL

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

This invention generally relates to improvements in computer systems, and more particularly, to system software for managing a network of heterogeneous client terminals communicating with a server in a consistent manner.

BACKGROUND OF THE INVENTION

Recently, it has become increasingly fashionable to speak of "intelligent," "smart," or "programmable" terminals and systems. Very few mainframe or peripheral manufacturers omit such a device from their standard product line. Although "intelligence," like beauty or art, is in the eye of the beholder, the adjective generally connotes that the device has a degree of autonomy or processing ability which allows it to perform certain tasks without assistance from the mainframe to which it is connected. Many such devices are programmable by virtue of including a microprocessor.

While operational devices are somewhat hazy and non-standard, a device is referred to as a terminal if a user interacts with the device to communicate to a host processor, referred to as a server in a network computing environment. Examples of terminals include keyboard/printer terminals, cathode-ray tube (CRT) terminals, remote-batch terminals, real-time data-acquisition and control terminals, transaction and point-of-sale terminals, and smart terminals.

A terminal is considered to be intelligent if it contains, hard-, firm-, and or software which allows it to perform alphanumeric or graphic message entry, display buffering, verifying, editing and block transmissions, either on host or human command. If the terminal contains a microprocessor which runs a standard program to service the terminal, and not arbitrary, user-loaded programs, the terminal has a fixed function, and is still just an intelligent terminal. Only when the device contains a general purpose computer which is easily accessible to the ordinary user for offering a wide range of programs selectable by a user or by devices attached to the device does the terminal become a network terminal in accordance with a preferred embodiment.

Sun has recently introduced a new language that is designed to provide consistency for network applications, named Java. Java is a general-purpose, concurrent, class-based, object-oriented programming language and support structure, specifically designed to have as few implementation dependencies as possible. Java allows application developers to write a program once and then be able to run it everywhere on a computer network.

The Java language solves many of the client-side problems by:
  enabling dynamic class bindings;
  providing enhanced portability of applications; and
  providing a secure environment in which applications execute.

Java is compiled into bytecodes in an intermediate form instead of machine code (like C, C++, Fortran, etc.). The bytecodes execute on any machine with a Java bytecode interpreter. Thus, Java applications can run on a variety of client machines, and the bytecodes are compact and designed to transmit efficiently over a network which enhances a preferred embodiment with universal clients and server-centric policies.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time applications can be created using the above-mentioned components.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

A network terminal in accordance with a preferred embodiment would execute Java applications in stand-alone mode, but have the capability to interact with a server for such functions as retrieving information, database processing, massive computation processing and access to shared devices such as high-speed printers, plotters and magnetic tapes.

The term "distributed computing" refers both to the devices at remote locations and to the logic which has been used to enhance the intelligence of the devices. Such distributed or decentralized computing with remote intelligent terminals and network terminals is a fact of life in today's computer literate society.

There are a number of drawbacks to distributed computing environments which are not found in a centralized computing environment. First, hardware problems: when a user locates a software solution that is optimal for the user's terminal environment, the software often will not execute on the host processor that is universally accessible by other's in a company. Moreover, the software will often be incompatible with other user's terminals.

Second, interfacing problems: a nonstandard terminal might require a special-purpose interface and might not be recognized by the host. Even standard interfaces are notorious for crashing the operating system. In any case, "mixed systems" containing multiple vendor hardware are becoming the norm, but lead to the blame for system problems being placed on the other system, and result in difficult debugging and resolving of system problems.

Third, host operating system support for a heterogeneous terminal environment can be a nightmare. To provide support for all of the various protocols, communication rates and processing demands with the peculiarities intrinsic to a motley crew of downstream terminals is a system administration headache.

Fourth, local software support: this type of support ranges from minimal (say, a compiler for the particular terminal) to a mail program that is compatible with every different terminal attached to the host server. Some applications can be rebuilt for a particular terminal by simply recompiling the application, but many are only distributed as runtime modules with no support provided for some terminals.

SUMMARY OF THE INVENTION

The foregoing problems are overcome in an illustrative embodiment of the invention in a network computing environment in which a plurality of clients are connected to one or more servers. When a client initiates a connection with a server, the server responds to the request for connection by transmitting a message back to the client to determine whether the client is a network terminal or not. The client responds with a message that is received by an application dispatcher at the server which takes one of a pair of actions based on whether the client is a network terminal. If the client terminal is a network terminal, then the application dispatcher spawns a server application in the server which responds to the client application in the client. Going forward, the server application responds to all future requests from the client application. If the client is not a network terminal, then the application dispatcher initiates a client application in the server to service the client terminal application requirements. Requests from the client application on behalf of the client terminal are subsequently serviced by a server application at the server which communicates to the client terminal via the client application at the server.

BRIEF DESCRIPTION OF THE DRAWINGS

The above and further advantages of the invention may be better understood by referring to the following description in conjunction with the accompanying drawings, in which:

FIG. 11 presents a table showing additional details associated with the device types, commands and data blocks in accordance with a preferred embodiment;

FIG. 12 presents additional detail on the message format in accordance with a preferred embodiment;

FIG. 13 illustrates the display commands and responses in accordance with a preferred embodiment;

FIG. 14 presents the status values associated with various operations in accordance with a preferred embodiment.

DETAILED DESCRIPTION

Figure 1:
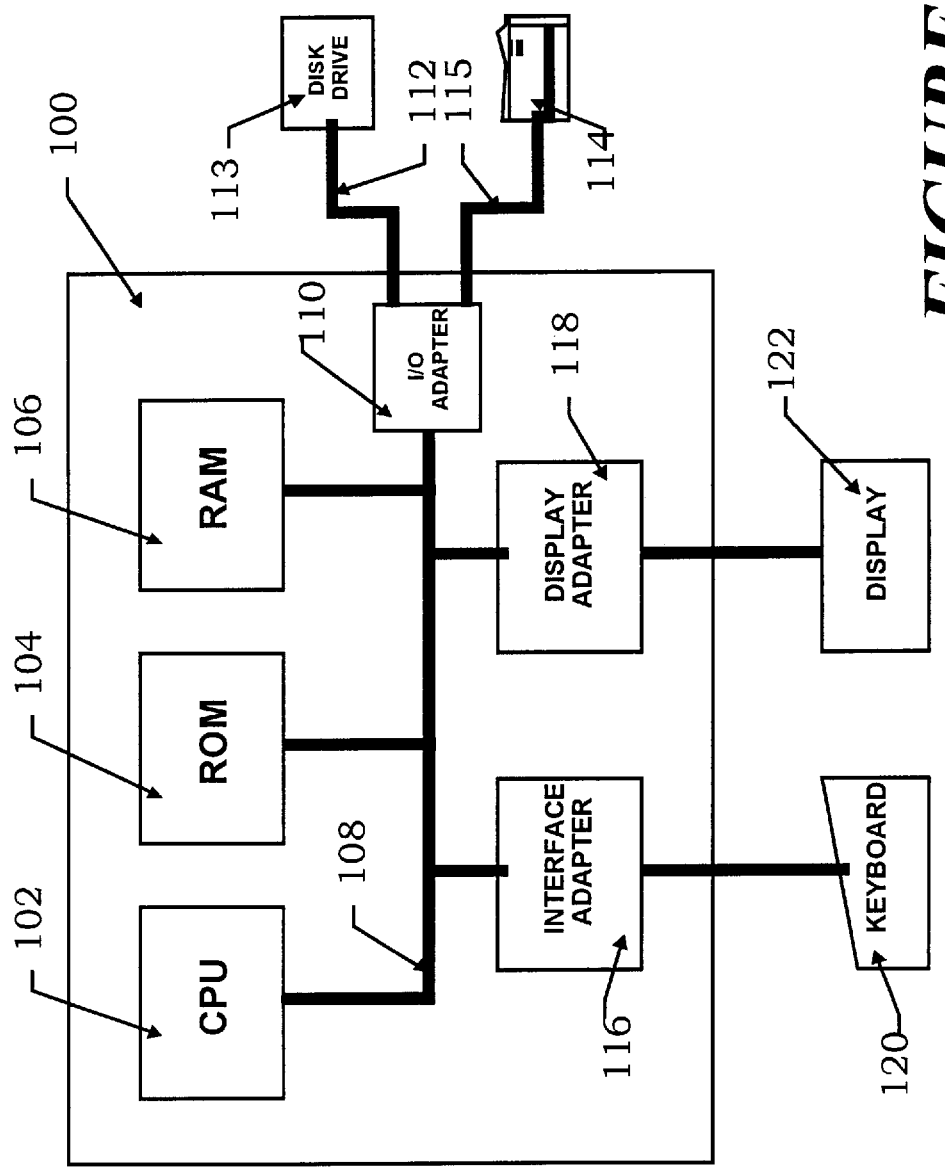
FIG. 1 is a block schematic diagram of a computer system for example, a personal computer system on which the inventive object oriented information manager operates.

The invention is preferably practiced in the context of an operating system resident on a computer such as a SUN, IBM, HP, or a Windows NT computer. A representative hardware environment is depicted in FIG. 1, which illustrates a typical hardware configuration of a computer 100 in accordance with the subject invention. The computer 100 is controlled by a central processing unit 102 (which may be a conventional microprocessor) and a number of other units, all interconnected via a system bus 108, are provided to accomplish specific tasks. Although a particular computer may only have some of the units illustrated in FIG. 1, or may have additional components not shown, most server computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral or network devices such as a disk unit 113 and printer 114 to the bus 108, via cables 115 or peripheral bus 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122, such as a video monitor. The computer has resident thereon and is controlled and coordinated by operating system software such as the SUN Solaris, Windows NT or JavaOS operating system.

Figure 2:
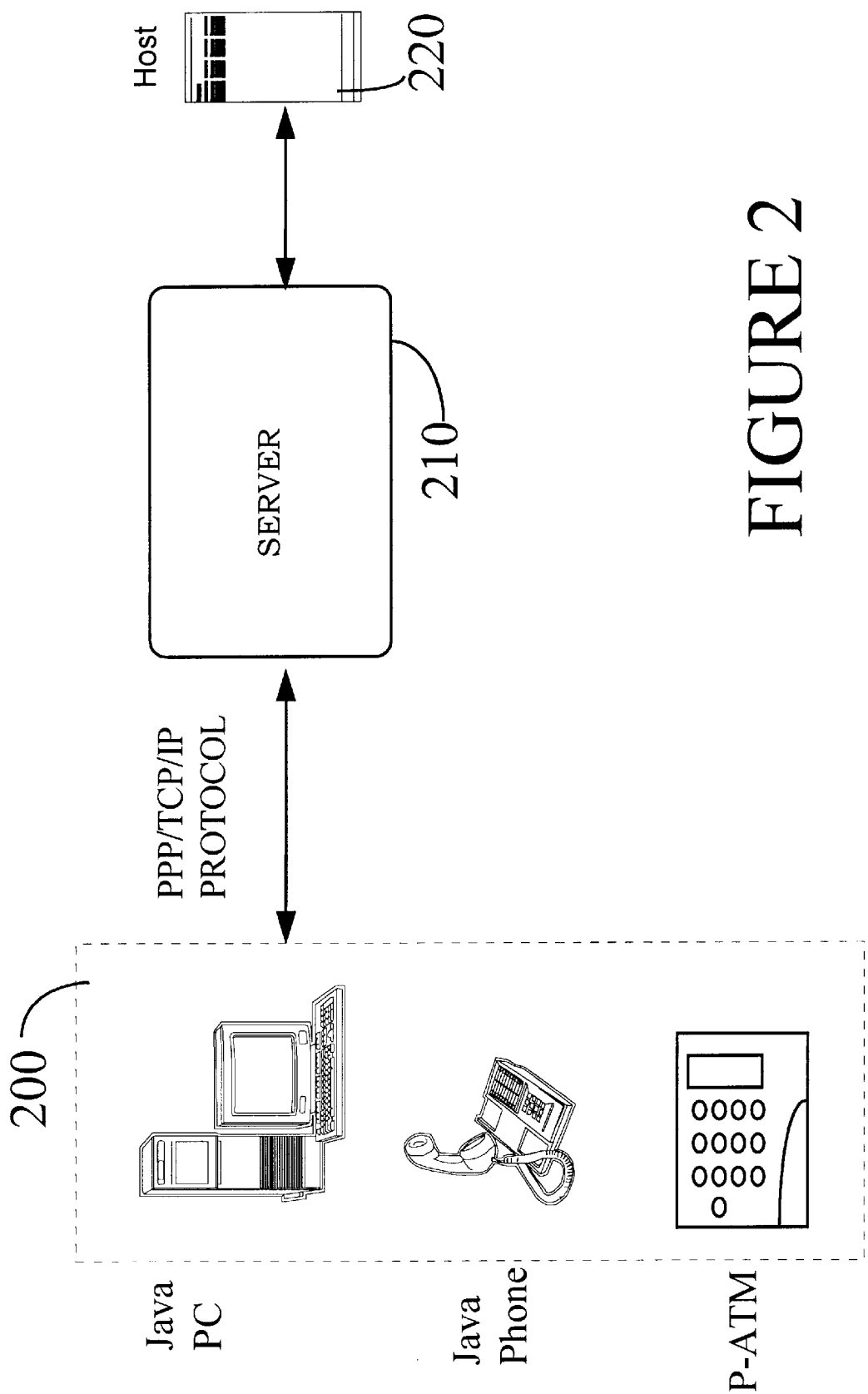
FIG. 2 illustrates a client-server network in accordance with a preferred embodiment.

FIG. 2 illustrates a client-server network in accordance with a preferred embodiment. A set of consumer devices (client terminals 200) are attached to a server 210 and the server is attached to a legacy host 220 to process applications requiring information at the host 220. The connection could be by means of the Internet, a dialup link, token ring, cellular phone, satellite, T1 or X.25 telco link or other communication means.

Server Software

The sever software is written using a combination of Java, C or possibly C++. C or C++ will be used mainly to implement platform dependent code (such as dealing with the comm ports). While a preferred embodiment discloses support for a dial up network and Internet processing utilizing TCP/IP, one of ordinary skill in the art will readily realize that a token ring, SNA or other network, such as those discussed in U.S. Pat. Nos. (5,530,961; 5,491,796; 5,457,797; 5,442,791; 5,430,863; 5,394,401; 5,291,597; 5,287,537; 5,287,461; 5,201,049; 4,991,089; and 4,588,211) could be readily interchanged as the network.

Architecture

A server architecture in accordance with a preferred embodiment supports two types of client terminals.

Network terminals.

These are client terminals capable of directly executing the Java applications on the client terminal which are initially stored on a server. The server will simply download this code to the client's network terminal which the client will then execute to provide a particular service. This service may or may not interact with other clients or servers. Network terminals can be connected to a server through a dial up modem link, directly through a local area network, or by other network communication means in accordance with a preferred embodiment.

Non-network terminals.

These are client's terminals which are not capable of executing Java applications on the client terminal. When dealing with this class of client the server will execute the application on behalf of the client. In this case the server will only expect necessary input and output operations to be performed by the client terminal. An example of how to connect a plurality of non-network terminals to a host server is described in U.S. Pat. No. 5,287,461, the disclosure of which is hereby incorporated by reference in its entirety.

Figure 3:
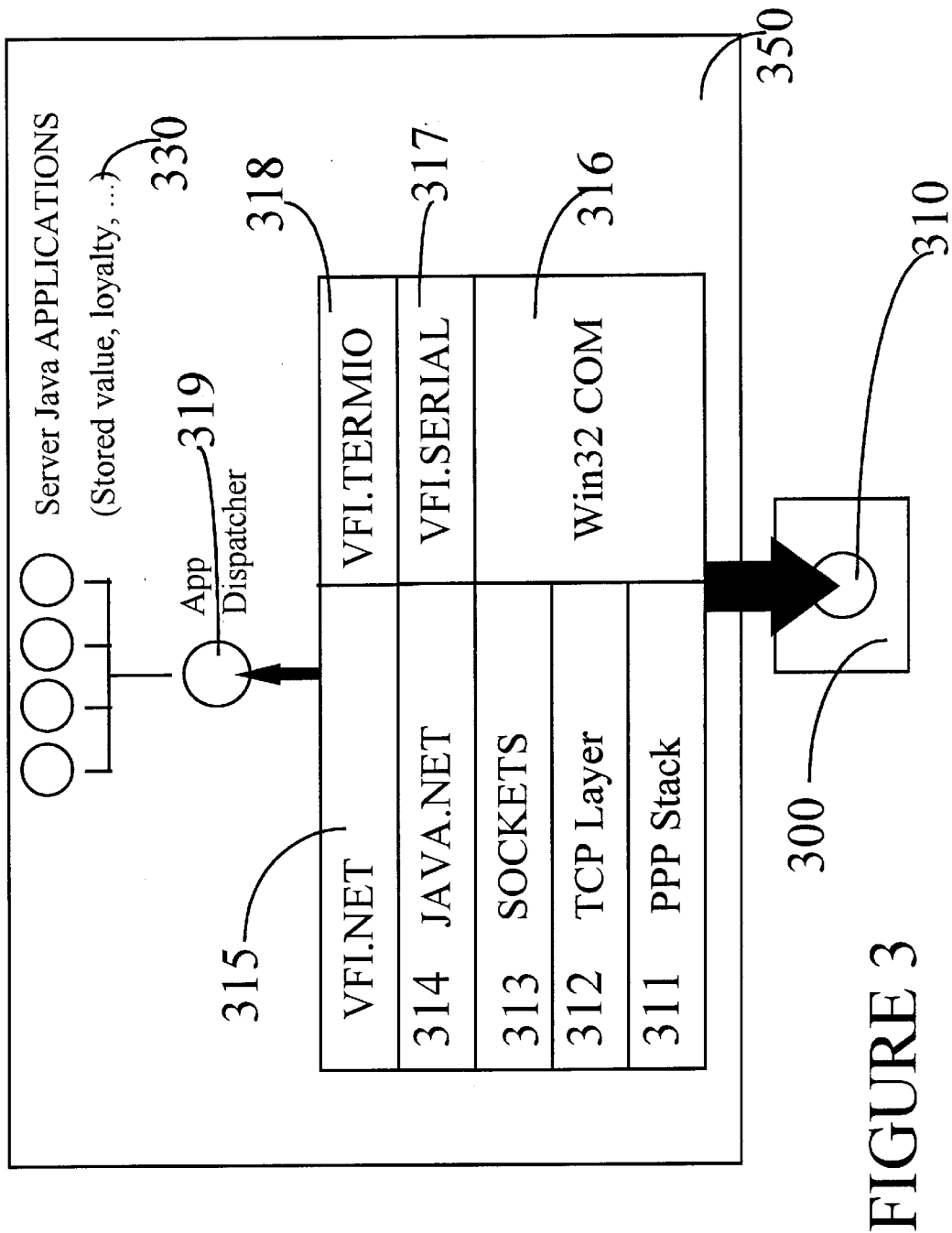
FIG. 3 illustrates a server architecture in accordance with a preferred embodiment.

FIG. 3 illustrates a server architecture in accordance with a preferred embodiment. A client 300 would initiate a connection with a server 350 by, for example, dialing in to a modem pool which is intercepted by the point-to-point stack software 311 which conforms information received to the TCP layer 312 which obtains a socket 313 for connecting the client 310 to the server 350. The Java net layer 314 further refines the request to conform with the TERMIO and NET layer 315 which passes the request along to the application dispatcher 319. The application dispatcher 319 spawns the appropriate server application selected from the server applications 330. On a non-network terminal, The non-network terminal initiates a "first connection" by dialing up a modem, for example. The dial up goes through the native OS 316 (Solaris or Windows NT dial up layer) and is connected with the serial communication in the VFI.SERIAL layer 317 which abstracts the serial input/output functions into a higher level communication layer. The VFI.NET layer 315 takes the abstracted serial layer and maps it into a similar communication as the communication from the network terminal 300. It makes the dialup asynchronous connection appear to the server application as a new socket connection.

Network Terminal—"First Connection"

Figure 4:
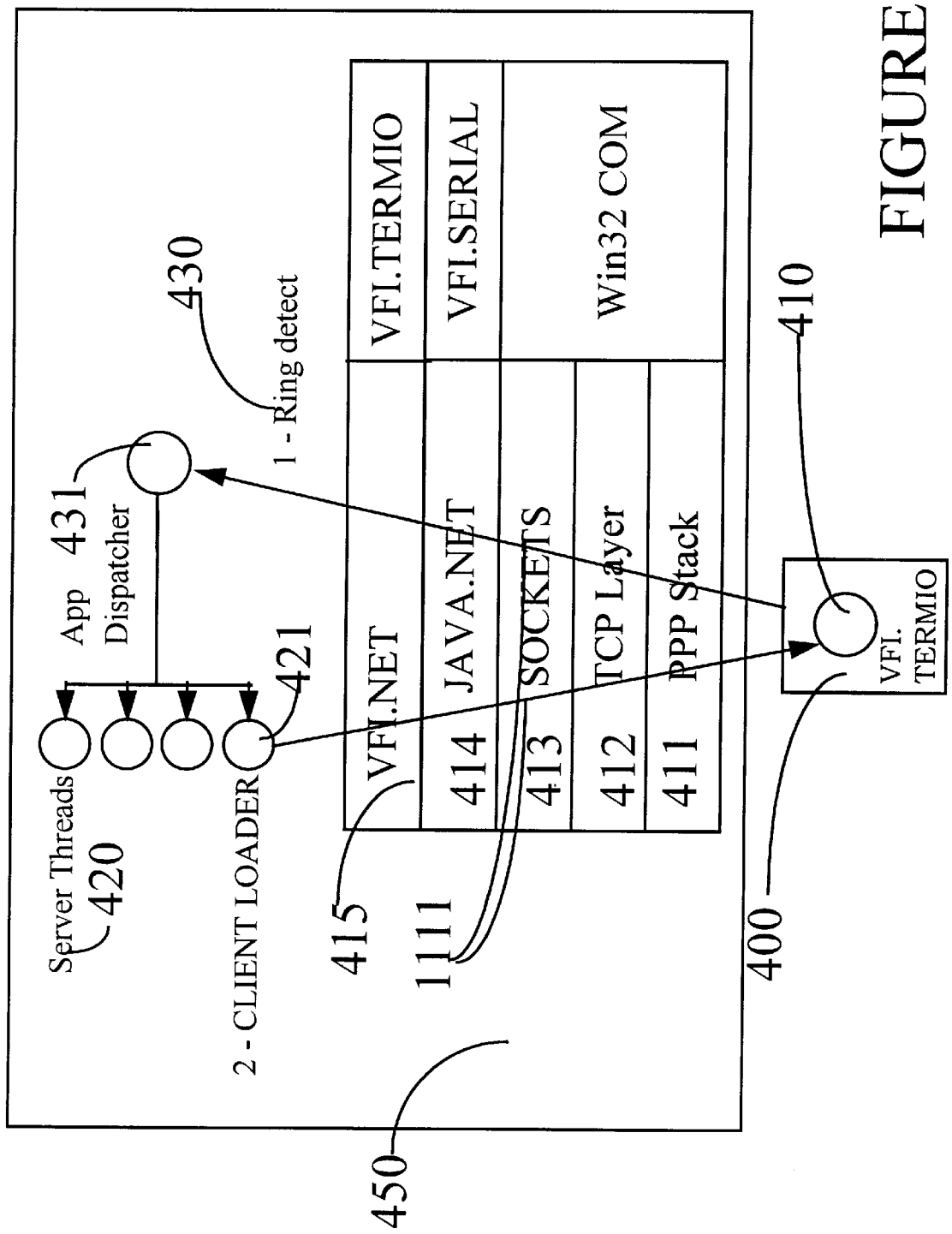
FIG. 4 illustrates a client-server architecture in accordance with a preferred embodiment.

FIG. 4 illustrates a client-server architecture in accordance with a preferred embodiment. The architecture is illustrated initially for a network terminal for clarity and then follows with a non-network terminal. Processing commences at 400 when a network terminal requests connection through a layered communication system to a set of server threads 420 which are triggered by a detection of a "ring" 430 to initiate possible client updates and the subsequent client appplication to server application processing. "Ring" refers to a "first connection" in socket processing in accordance with a preferred embodiment.

The network terminal makes its connection through the Point-to-Point-Protocol stack 411 utilizing the TCP layer 412 and the sockets layer 413, which is like an electrical socket, for attaching terminals to communication sockets to facilitate communication through the network. All of this is managed by the Java.net 414 which connects the socket 1111 via the TCP layer 412 and the PPP stack 411. The layer above is the VFI.net and VFI.TERMIO 415 which is responsible for detecting that the connection is made and mapping the connection to an application dispatcher 431 to further process the first connection (ring) request.

The server 450 waits for a "first connection" request much like an interrupt manager. When a "first connection" request arrives, then the application dispatcher has a method that detects a connect request or a LAN "first connection" request that would arrive through the TCP layer as a socket connect. That connection is translated into a logical ring which is equivalent to an event or interrupt. The server 450 responds to the "first connection" with a query initiated by the application dispatcher 431 requesting "who are you" via an enquiry message asking for identification by the client loader thread 421. The network terminal responds with ID information, including the identification of the application that the network terminal requires. If the terminal answers with an identifier indicating that the terminal is a network terminal, then the client loader thread 421 performs any necessary client application updates via a download using a file transfer program such as UDP or FTP, or any other socket layer protocols that are available for network file transfers to the network terminal 400.

Network Terminal—First Client Request to Server

Figure 5:
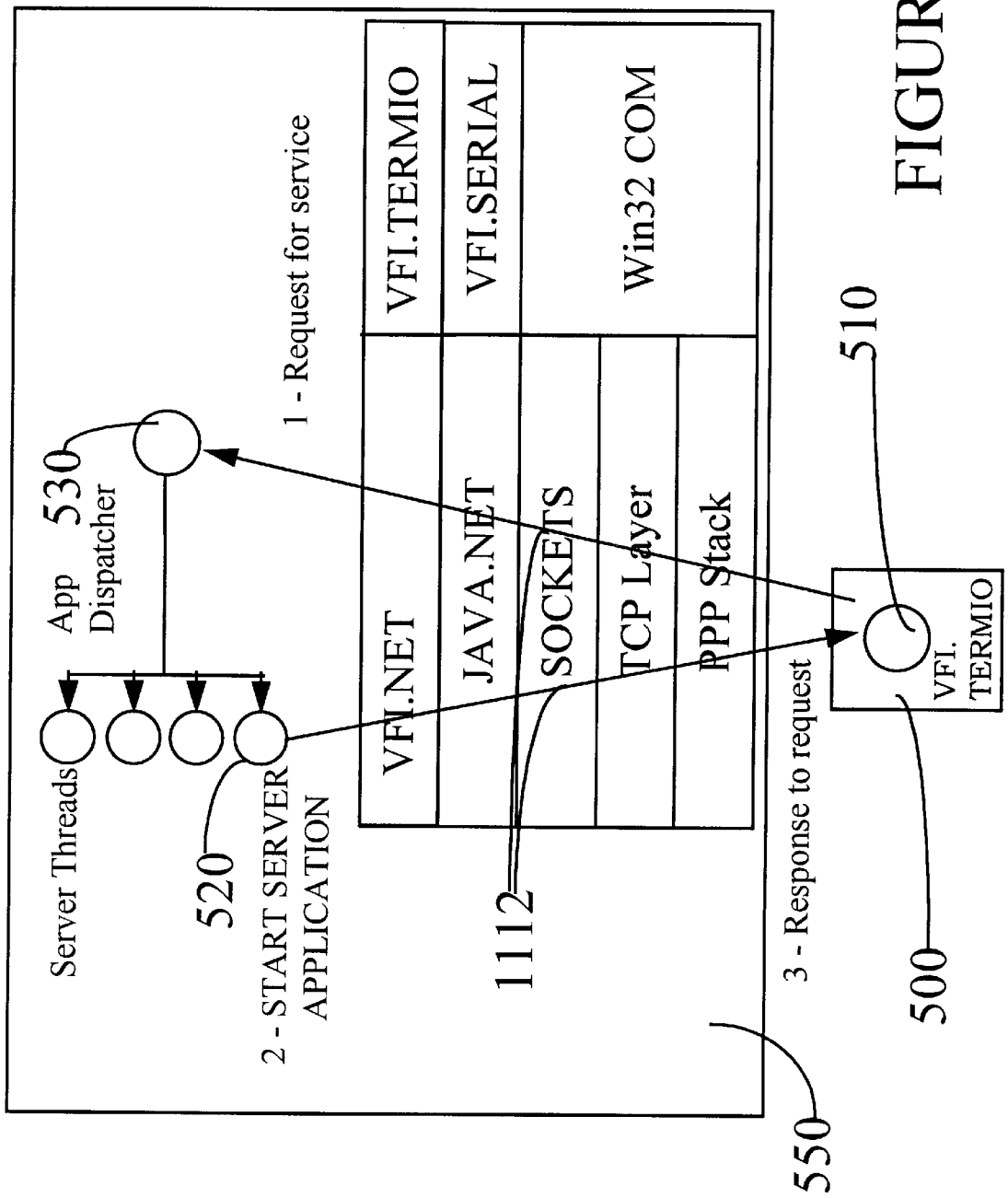
FIG. 5 illustrates a first client request to a server in accordance with a preferred embodiment.

FIG. 5 illustrates a first client request to a server in accordance with a preferred embodiment. When a first client request is transmitted from the network terminal 500 with a client application resident thereon 510 to the server 550, the application dispatcher 530 spawns the corresponding server application 520 for servicing the request at the server 550 via the assigned socket 1112. The server application 520 responds to the request and transmits information to the network terminal 500. The application dispatcher 530 has completed its responsibilities for this client 500 and can return to a wait state until the next "first connection" request from a client. The client application request could be as simple as a get current time request or a request for data from a server database.

Network Terminal—Subsequent Client Request to Server

Figure 6:
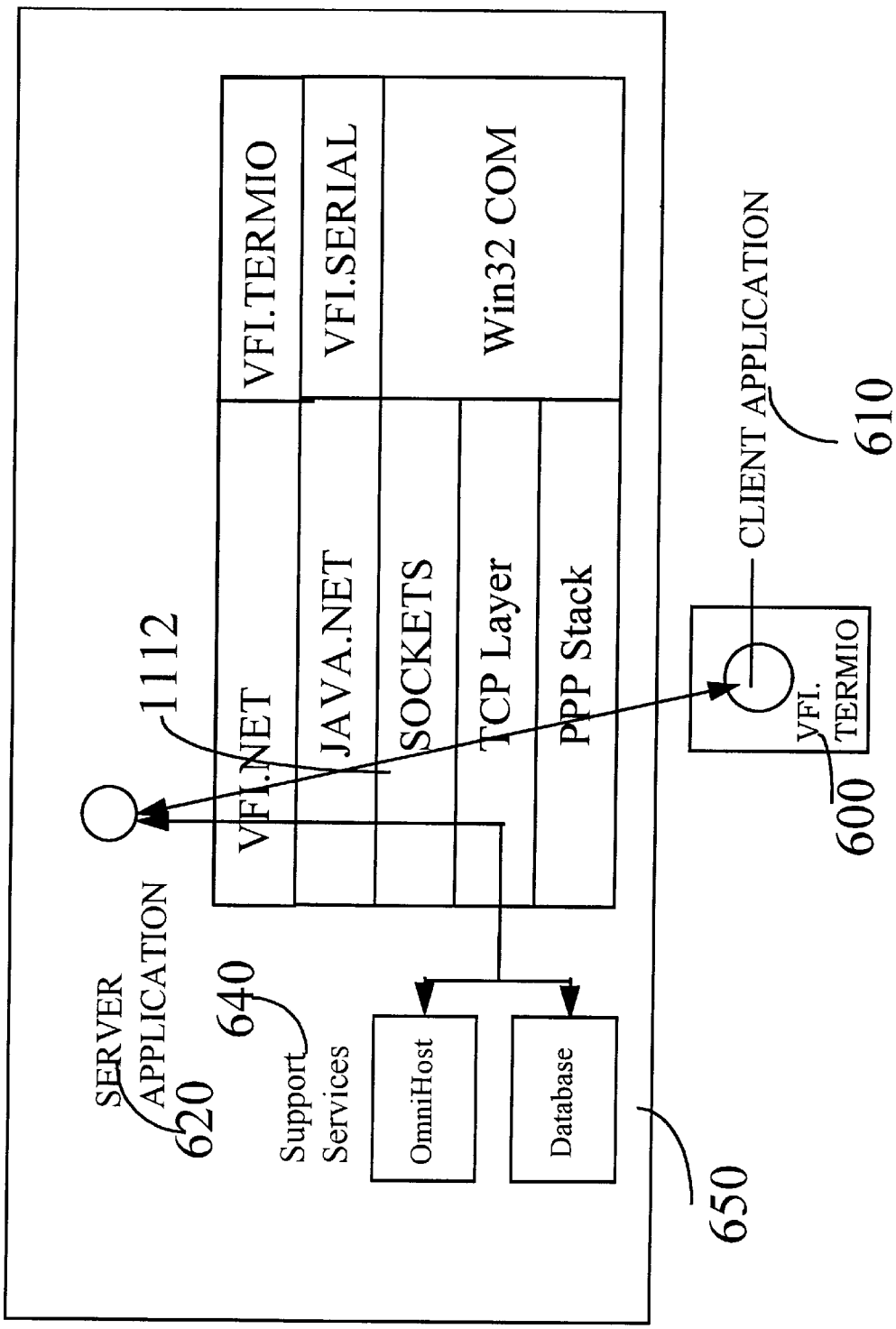
FIG. 6 illustrates a client server environment which accesses support services in accordance with a preferred embodiment.

FIG. 6 illustrates a network terminal 600 with a downloaded client application 610 which accesses support services in the server 650 through its assigned server application 620 in accordance with a preferred embodiment. The terminal 600 communicates to a server application 620 which accesses host processing capabilities and database services 640 to service requests emanating from the client application 610. The server application 620 handles any events that originate from the client application 610 via the assigned socket 1112. These events could include data requests from a database application, or data transfer to a server. Remote data from another server application could also be accessed by the client. Server application 620 accesses support services directly or via a socket interface 660.

Non-network Terminal—"First Connection"

Figure 7:
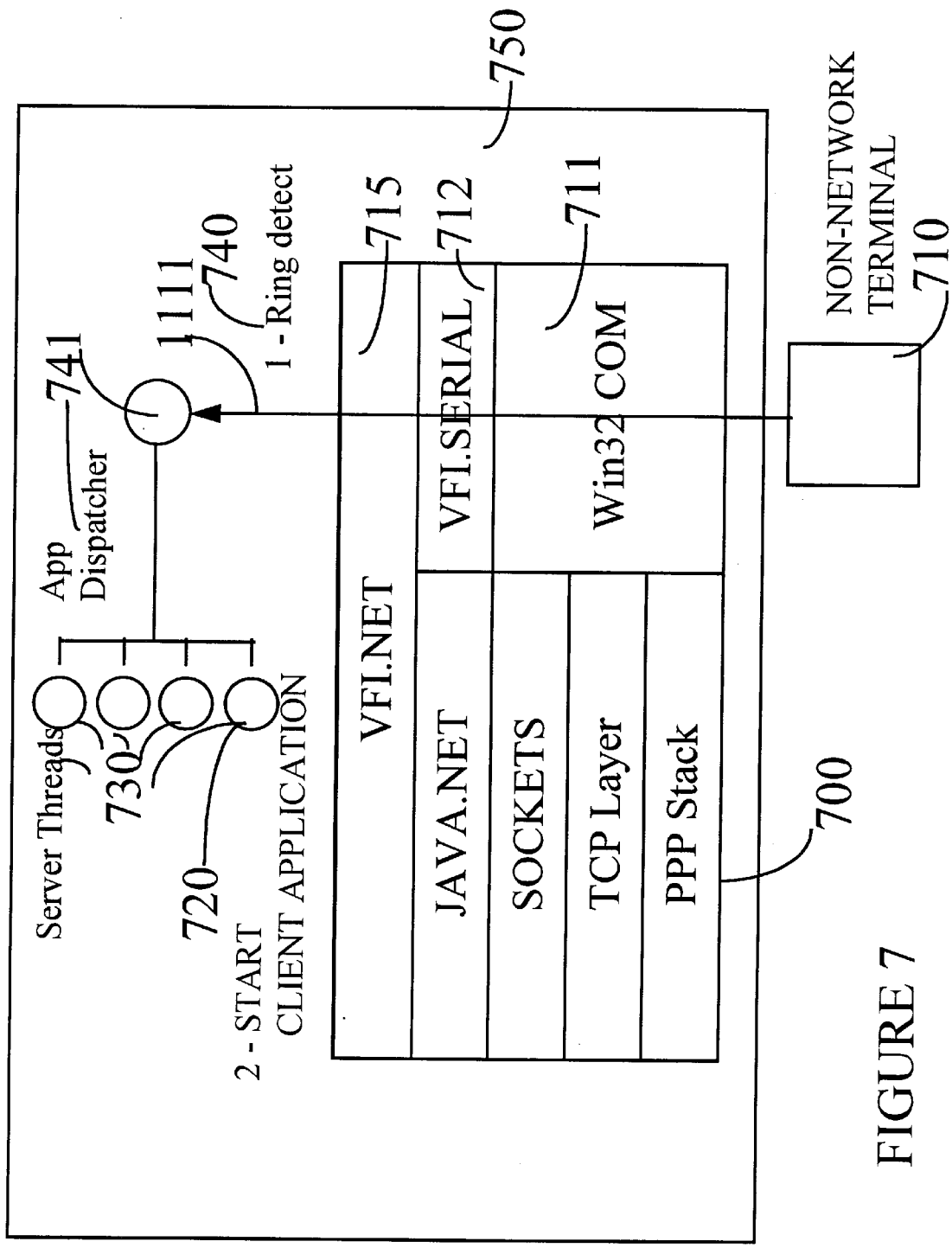
FIG. 7 is an architecture diagram of a client-server system in accordance with a preferred embodiment.

FIG. 7 is an architecture diagram of a client-server system in accordance with a preferred embodiment. A layered communication system 700 is used by a non-network terminal 710 to detect a ring providing an indicia of communication 740 and dispatch an application 730. Dispatching an application 730 also initiates a server thread 720 for servicing the client request. The non-network terminal 710 initiates a "first connection" by dialing up a modem, for example. The dial up goes through the native OS 711 (Solaris or Windows NT dial up layer) and is connected with the serial communication in the VFI.SERIAL layer 712 which abstracts the serial input/output functions into a higher level communication layer. The VFI.NET layer 715 takes the abstracted serial layer and maps it into a similar communication as the communication from the network terminal. It makes the dialup asynchronous connection appear to the server application as a new socket connection 1111. The communication is an event 740 that triggers actions by the application dispatcher 741 which responds to the "first connection" event by requesting ID information from the client, via an enquiry message, and starting the requested client application 720 at the server 750.

Non-network Terminal—First Client Request To Server

Figure 8:
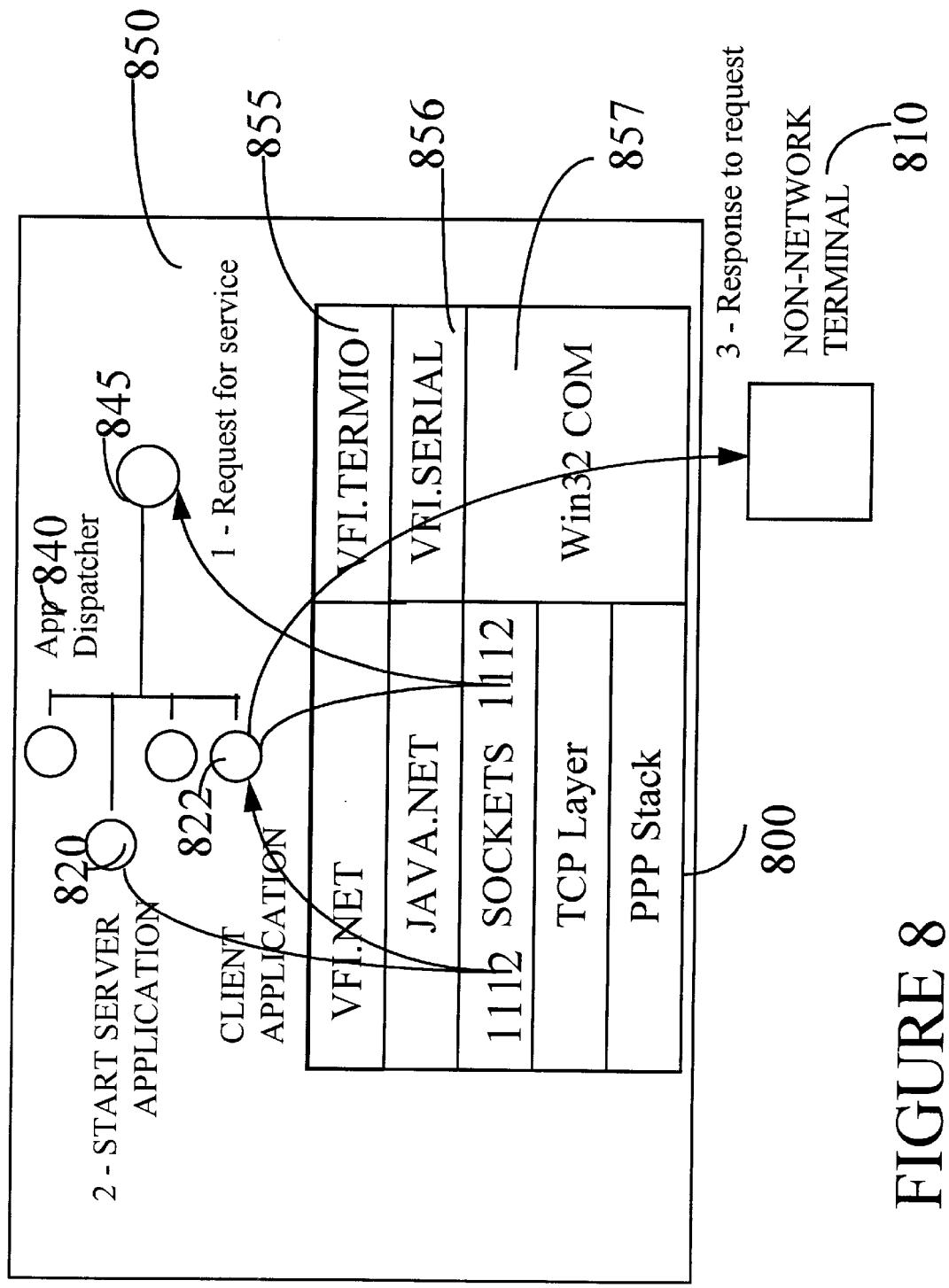
FIG. 8 is an architecture diagram of a client-server system in accordance with a preferred embodiment.

FIG. 8 is an architecture diagram of a client-server system in accordance with a preferred embodiment. The client application 822 is responsible for managing the non-network terminal 810. The client application 822 writes information, utilizing a server version of VFI.TERMIO 855, to and responds to key presses by the non-network terminal 810 at the server 850. The client application 822 initially makes a request for service from a socket 1112 that is associated with the non-network terminal 810 when the application dispatcher 840 spawns the client application 822.

When the first request 845 is generated by the client application 822 residing on the server 850, at application startup, the first request for service is routed in the server 850 to the application dispatcher 840 and spawns the server application 820 which will handle subsequent requests. The server application 820 makes a request for service from a socket 1112 that is associated with the client application 822 which transmits an appropriate command through the VFI-.TERMIO 855 to the VFI.SERIAL layer 856 using the operating system communication support 857 to the non-network terminal 810. This processing is identical to the network terminal processing with the exception that all applications reside on the server 850 as opposed to a Java application executing remotely on the network terminal.

One advantage of Java is that it is machine independent and does not care whether a Java application resides on the client or the server. In the case of the non-network terminal, the client application resides in the server and controls the java incapable terminal.

Non-network Terminal—Subsequent Client Requests to Server

Figure 9:
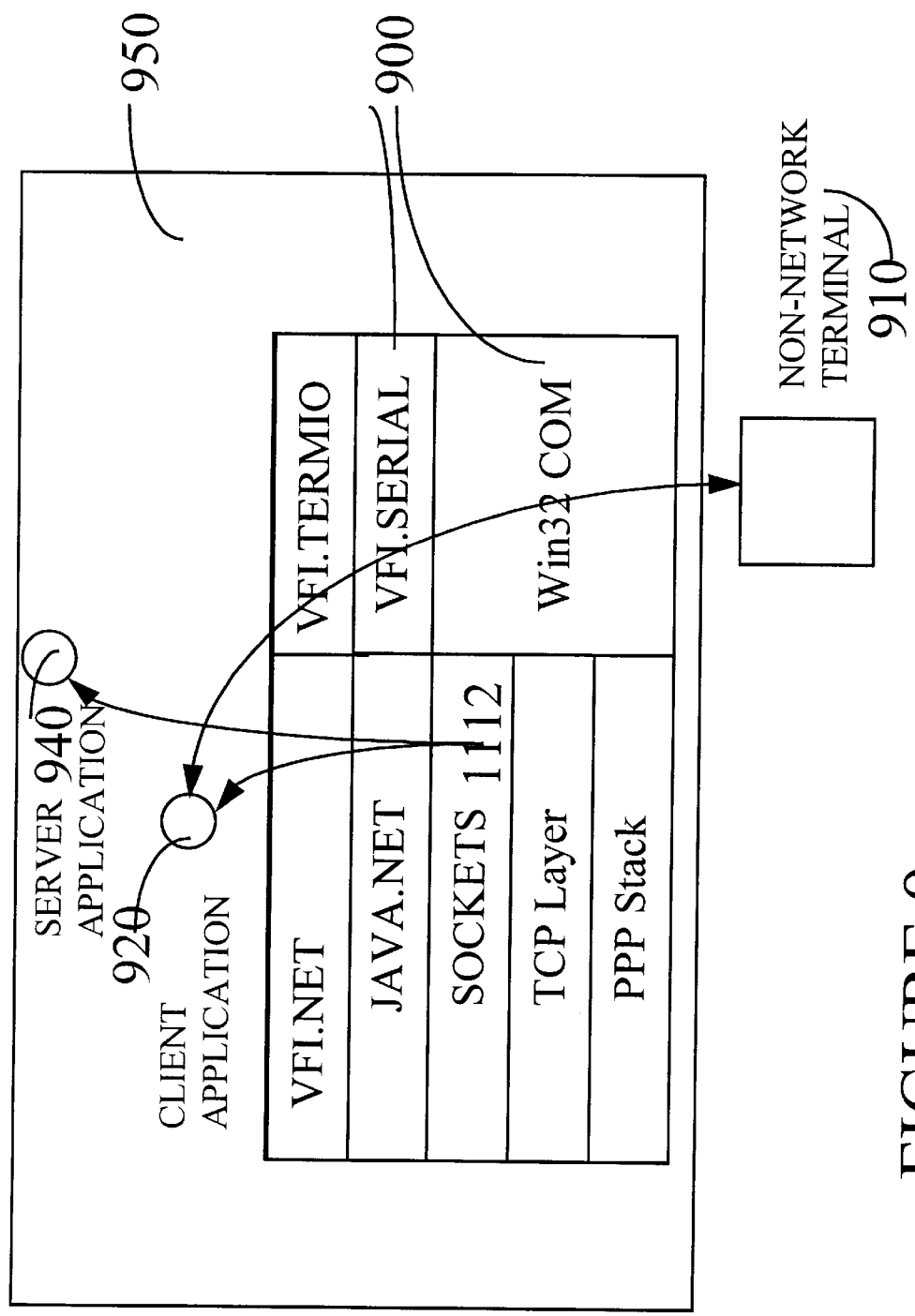
FIG. 9 is an architecture diagram of a client-server system in accordance with a preferred embodiment.

FIG. 9 is an architecture diagram of a client-server system in accordance with a preferred embodiment. A layered communication system 900 is used by a non-network terminal 910 to manage the interconnection of a server Application 940 to a client application 920 and facilitate communication between the terminal 910 and server application 940 via a client application 920 resident on the server 950. FIG. 9 shows the processing after the first request has been completed and the client application 920 is coupled with the server application 940 via the assigned socket 1112 just as in the network terminal example, except the client application 920 and server application 940 both reside on the server 950.

If a terminal responds with a message that indicates it is a non-network terminal, then the terminal is supported with the command streams described in FIGS. 10–14. If the terminal is a network terminal, then the application is downloaded via a FTP or other network file transfer procedure.

Figure 10:
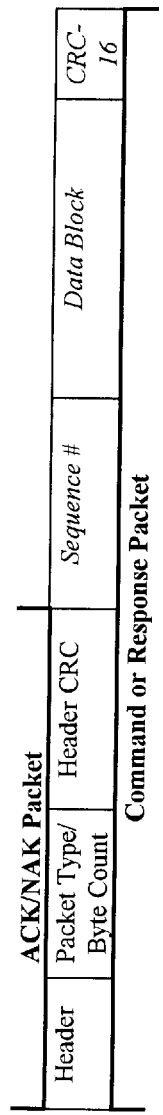
FIG. 10 illustrates the message format utilized in accordance with a preferred embodiment.

FIG. 10 illustrates the structure of a packet in accordance with a preferred embodiment. FIG. 11 shows the format of each field of a communication and describes the contents of the same. For example, the header is two bytes in length and has various values that correspond to different types of transactions. Similarly, the Packet Type, Header CRC, Sequence #, Data Block and CRC-16 fields are described in the table set forth in FIG. 11.

FIG. 12 represents a table showing additional details associated with the device types, commands and data parameters. For example, the device type field is one byte long and specifies the selected Input/Output device. FIG. 13 illustrates the display commands in accordance with a preferred embodiment. The display's device type is zero. FIG. 14 presents the status values associated with various requested operations in accordance with a preferred embodiment.

Figure 15:
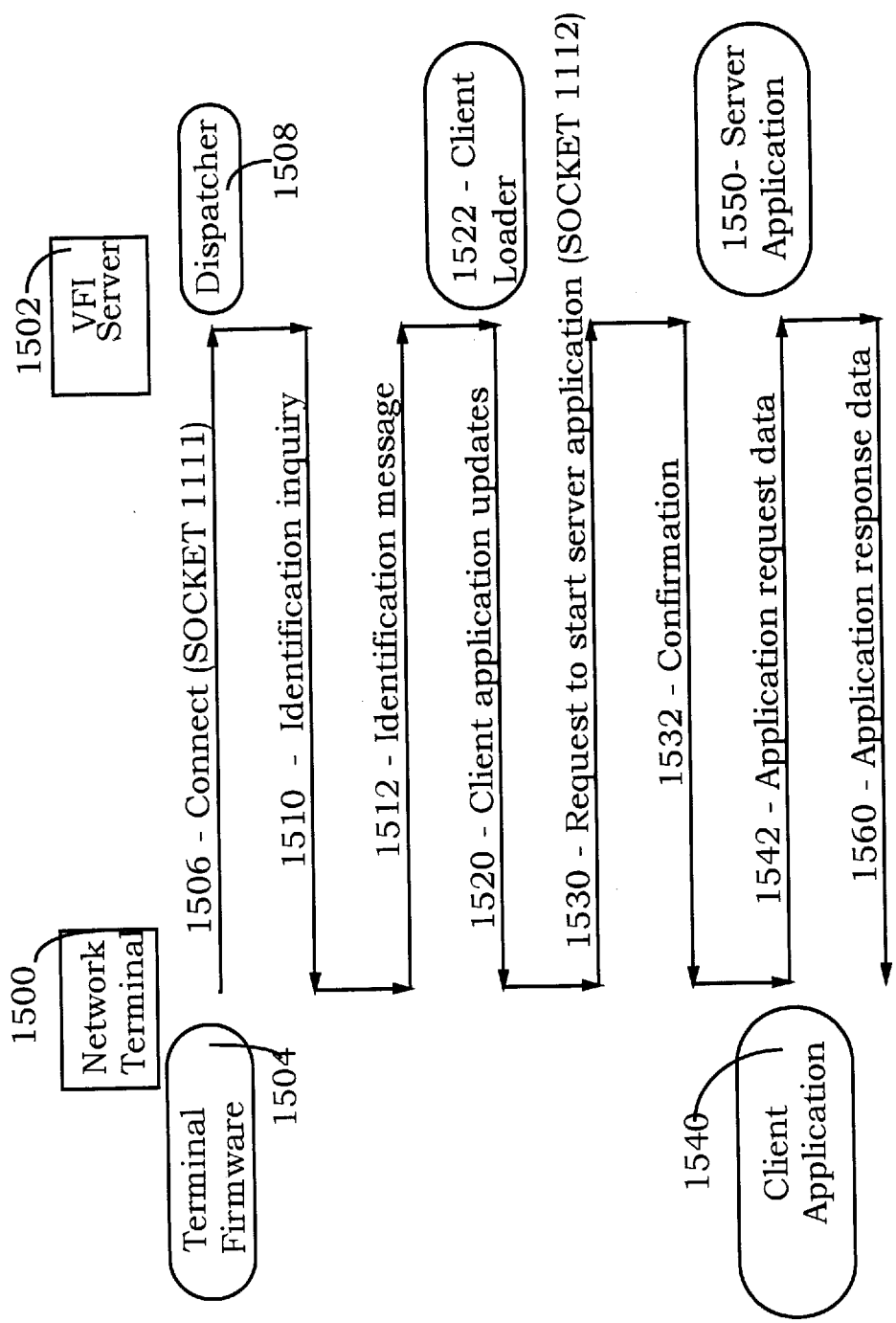
FIG. 15 is a communication flow diagram in accordance with a preferred embodiment.

FIG. 15 is a communication flow diagram in accordance with a preferred embodiment. A terminal 1500 either has firmware or an application 1504 that initiates a connection 1506 with a server 1502 by contacting a dispatcher 1508. The connect initiate 1506 also connects a socket 1111 to handle the connection. The dispatcher 1508 transmits an identification enquiry 1510 which the client terminal replies to with an identification message 1512. In the case of a network terminal, the client loader 1522 performs any necessary client application updates 1520 on the client terminal 1500. In the case of a non-network terminal, the dispatcher starts the client application. The client then sends a request to start the server application 1530 to the server which results in the connection of a socket 1112 and the server application 1550 being started and a confirmation message 1532 being transmitted back to the client application 1540. Then, when the client application 1540 requests data 1542 from the server application 1550, the server application 1550 responds with the application response data 1560.

Application dispatcher—Control Flow Application dispatcher startup

Configured modem ports that will take part in transactions are pre-configured. The Application Dispatcher (AD) startup code looks at this configuration stream to determine the number of S threads (serial port listeners). S classes instantiate a VFI.NET.serversocket object which in turn create a VFI.NET.ModemIO.ModemPort object. The ModemPort object binds to a low level VFI.NET.ModemIO.Port object which utilizes native methods to configure and wait on the communications port.

```
SO
{
    serversocket SOSocket = new serversocket ("socket1111", 1);
//Listener object
    {
        socket SOConnSocket= SOSocket.accept( ); //
Translates to
        WaitDevice(CONNECT)
            ReadAndValidate (RequestID);
            return RequestID, SOConnSocket;
    }
}
```

REQUEST PROCESSING

As illustrated above, S threads are transient threads. And even when alive they perform efficient waits (No CPU cycles are consumed). The AD receives the RequestID from each S thread. Request processing is performed by database lookup. Typically Requests, are simple text messages with delimiters and are parsed using a StringTokenizer object.

StringTokenizer stParseHelp=new StringTokenizer ((String) Request);

field1=stParseHelp.nextToken( );

field2=. . . and so on.

The AD will query a database to determine which applications should be initiated based on the enquiry message utilizing an SQL query of the form:

" S E L E C T < F i e l d ClassPath>from<TableName>where<f1=field1 and . . . >; is handled by the JDBC layers to return data to the AD. The AD is now ready to run the client thread.

ClientThread=new Thread (field1, field2 . . . , SOConnSocket);

The field list contains appropriate fields (those required for client application processing) and are passed down to the client thread along with the connected socket object.

Client Threads

Client Threads proxy the actual application. Application output meant for the terminal's devices are routed out using VFI.TERMIO as directives to the client terminal's firmware. The connected socket (which translates to a live dial-up connection) is passed down from the AD to the client thread. Client threads are long living—usually transferring data to corresponding servlets that initiate connections to upstream hosts or make database transactions. Despite the fact that client threads can be JDBC aware, servlets handle database transactions. This helps to maintain code constancy when the same client class is downloaded to a Java capable terminal for remote execution.

Terminal I/O is performed through a VFI.TermIO object that in turn instantiates a VFI.TermIO.ServProtocol object. The protocol object implements the actual data transfer with the client terminal. The protocol object requires the socket object passed down from the AD to the client thread.

```
CO (Appropriate Request fields, SOConnSocket)
{
    VFI.TermIO IOObject = new TermIO (SOConnSocket); //IO
object    //instantiation. This cascades into a ServProtocol
Object instantiation.
    IOObject.WriteString (StringIndex); //Displays a particular
string on the P-ATM.
    //If the client needs to retrieve data from upstream hosts
(OmniHost, VISA etc),    //or needs data from a database it makes
a TCP stream connection to a servlet.
    //This is consistent with the behavior of the network
terminal which would    //make the same connection over PPP.
    clienTransObject = new Socket (<Host>, <Well known
socket>);
    //Explained further down under initial client requests
    . . . . .    //Further processing
    //Send out host requests
    clienTransObject.write (HostRequest);
    clienTransObject.read (HostResponse);
    IOObject.WriteString (StringIndex + n); //Displays status on
the P-ATM.
}
```

Initial Client Request Processing

The AD runs a T thread (spawned off during startup) that listens on a well-known socket (e.g. 1112) waiting for initial ClientRequests from a client application. The T thread processes the ClientRequest to determine which servlet class needs loading.

```
T
{
    ClientInitialRequestListener = new ServerSocket (<wellknown
socket (e.g. 1112)>);
    //Wait for initial requests and spawn off server
    connSocket = ClientInitialRequestListener.accept( );
    connSocket.Stream.read (InitialRequest);
    Parse (InitialRequest);
    HostThread HO = new Thread (connSocket, "class name");
}
```

The T thread is a daemon thread and lives as long as the AD lives. When the client application is downloaded to a Java capable terminal initial requests arrive over the PPP link.

Host Threads Or Servlets

Host Threads (H) service client requests for upstream and database connectivity. A host thread can make TCP connections with remote hosts, forward financial transactions originating from the client application and route the response.

```
HO (connSocket)
{
    connSocket.Stream.read (ClientRequest);
    ParseRequest (StringTokenizer);
    Socket upstreamSock = new Socket (upstreamHost, Port);
    //Transact
    connSocket.Stream.Write (HostResponse);
}
```

Transient And Long-Living Threads In The Application Dispatcher

A Sockets Based Abstraction Of The Win32 Communication API

Consistence in the access of transport layer services needs no over emphasis. The design of the PTS server aims to provide a uniform interface to third party client component and server component applet writers to the async dial-up protocol module and the system's TCP/SLIP/PPP stack. This interface comprises a set of Java Classes collectively called VFI.NET.*. It should be noted that this package does not provide pure TCP/UDP/IP specific objects and methods that are already defined and implemented in java.net.*. Programmers, however, do not need to explicitly import java.net.*. This is automatically done by the package. Further, this document does not discuss the functionality of java.net.* which may be found in the appropriate JDK documentation. It, merely, details a class design that overloads methods specifically necessary to build a BSD sockets like layer between calling applets (servlets) and the machine specific Java serial communications package.

Hierarchy

A uniform upper edge interface for the ModemIO classes permits easy replacement of the implementation. The actual modem handling code, for instance, may use the TAPI client calls instead of direct Win32 communication calls. Multiple libraries that conform to the same interface allow different link level protocol stacks (like MNP3). This ensures the constancy (and hence direct portability) of VFI.ModemIO.*.

Required Modemio Functionality

1. Open an end-to-end async, duplex dial-up connection. The station address (InetAddress as in TCP/IP) is the dial string. Configure upon connection.

2. Listen for an incoming dial-up connection. The listen port (analogous to the bound TCP port) is the COM port. In this regard the valid port numbers range from 0–0xFF (which is the maximum number of COM ports allowed in NT). Configure upon initialization.

3. Obtain Input and Output streams that re-direct from/to the open connection.

4. Hang-up (close as in TCP/IP) a live connection.

The following classes form a part of VFI.ModemIO.*

Raw Serial Port Handling

```
public class VFI.ModemIO.Port
{
    //Contructors
    public Port (int nPortNum);
    public Port (int nPortNum, int nBaud, int nParity, int nDataBits, int nStopBits);
    public Port (int nPortNum, String sCfgStr);
    public Port (String sPortName);
    public Port (String sPortName, String sCfgStr);
    //Methods
    public void close( );
    public int getPortID( );
    public String getPortName( );
    public String getCfgStr( );
    public InputStream getInputStream( );
    public OutputStream getOutputStream( );
}
```

Modem Initialization And Methods

```
public class VFI.ModemIO.ModemPort
{
    //Constructors
    public ModemPort (int nPortNum);
    public ModemPort (Port objPort);
    public ModemPort (String sPortName);
    public ModemPort (int nPortNum, String sInitString);
    public ModemPort (Port objPort, String sInitString);
    public ModemPort (String sPortName, String sInitString);
    //Methods
    public Port getPort( );
    public boolean connect (String sDialString);
    public void disconnect( );
    public void reset( );
    public boolean configure (String sCfgStr);
    public boolean configureDM (String sCfgStr);
}
```

Programmers must use getPort( ) to capture a stream and transfer data over the ModemPort. Configure(String) sends out an AT command and returns TRUE if the modem returned OK<cr><lf>. configureDM(String) sends out the same command to the modem when in data mode.

Net—The Sockets Wrapper

The package encapsulates two major classes found in java.net.* Socket and ServerSocket. To present a familiar interface and yet avoid conflicts, the package instantiates its own socket and serversocket objects via constructors that take an extra parameter (that identifies the lower object that needs to be instantiated). This is illustrated after the class definition.

Station Address Resolution

The InetAddress object refers to an unique long value that corresponds to the machines TCP/IP address. The async dial-up line may however use multiple COM ports to open a connection with the host. Heuristically, it may seem that fitting the TCP/IP host/machine address into the native COM support library will permit overloading of InetAddress and hence enhance elegance. This, however, results in extra and avoidable complexity. In this regard, InetAddress will still correspond only to a TCP/IP address. The versions of the java.net.Socket constructor that accept the host name (as a String) will, instead, be overloaded. This value will now refer to a dial String that identifies the remote station address.

Socket Initialization And Connection

```
public class VFI.NET.socket
{
    //Constructors
    public socket (String sHost, int nPort, int nProtocolType);
    /*  nProtocolType may take one of two values:
            PF_INET       #defined to 1
            PF_VFI_PTS_MODEMIO #defined to 2
        Passing a value of 0 causes the use of
    java.net.Socket.*/
    //Methods
    public void close( );
    public String getStationAddress( );
    public int getPort( );
    public InputStream getInputStream( );
    public OutputStream getOutputStream( );
}
public class VFI.NET.serversocket
{
    //Constructors
    public serversocket(int nPort, int nProtocolType);
    /*  nProtocolType may take one of two values:
            PF_INET       #defined to 1
            PF_VFI_PTS_MODEMIO #defined to 2
        Passing a value of 0 causes the use of
    java.net.ServerSocket.*/
    //Methods
    public socket accept( );
    public void close( );
    public int getPort( );
}
```

Interface Library to native Win32 Comm. Api Methods

HANDLE OpenDevice (int nDevNum, DCB * pNewDCB);
void CloseDevice (HANDLE hDevice);
int WriteDevice (HANDLE hDev, int nBytesToWrite, unsigned char * pWriteBuf);
int ReadDevice (HANDLE hDev, int nBytesToRead, unsigned char * pReadBuf);
BOOL ConfigureDevice (HANDLE hDev, DCB * pNewDCB);

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by letters patent is:

1. A distributed computer system including a client terminal and a server which communicate via a network, comprising:

(a) the client terminal initiating connection to the server utilizing the network;

(b) the server responding to the initial connection by transmitting an enquiry message to the client terminal;

(c) the client terminal responding to the enquiry message with a message comprising identification information indicative of the client terminal being a network terminal or a non-network terminal and identifying a client application the client terminal requires;

(d) the server receiving and analyzing the identification information to determine if the client terminal is a network terminal or a non-network terminal; and (d1) if the client terminal is a network terminal, then the client loader on the server starts the client application, if necessary, on the client terminal utilizing the network and starts a server application to service future requests from the client terminal; and (d2) if the client terminal is a non-network terminal, then the server initiates the client application and server application on the server for processing the client application at the server for the client terminal.

2. The distributed computer system as recited in claim 1, wherein the start of the client application entails a, download of the client application to the client terminal.

3. The distributed computer system as recited in claim 1, in which the client terminal communicates to the server utilizing a dial-up network connection.

4. The distributed computer system as recited in claim 1. wherein the identification information comprises configuration characteristics of the client terminal.

5. The distributed computer system as recited in claim 1, wherein the network terminal executes Java code on the network terminal.

6. The distributed computer system as recited in claim 1, wherein the same client application is executed on the server and the client terminal.

7. The distributed computer system as recited in claim 1, wherein the non-network terminal receives commands from the client application on the server.

8. The distributed computer system as recited in claim 1, including means for passing a client application request to another server to process the request.

9. A method for distributing computing between a server and a client terminal which communicate via a network, comprising the steps of:

(a) initiating connection of the client terminal to the server utilizing the network;

(b) responding to the initial connection request at the server by transmitting an enquiry message to the client terminal;

(c) responding to the enquiry message at the client terminal with a message comprising identification information indicative of the client terminal being a network terminal or a non-network terminal and identifying a client application the client terminal requires;

(d) receiving and analyzing the identification information at the server to determine if the client terminal is a network terminal or a non-network terminal; and (d1) loading a server application if the client terminal is a network terminal, which starts the client application if necessary, on the client terminal utilizing the network and starts a server application to service future requests from the client terminal; and (d2) loading a server application on the server, if necessary, which initiates a client application on the server for processing the client application at the server on behalf of the client terminal, if the client terminal is a non-network terminal.

10. The method as recited in claim 9, wherein the start of the client application entails a download of the client application to the client terminal.

11. The method as recited in claim 9, including the step of communicating between the client terminal and the server utilizing a dial-up network connection.

12. The method as recited in claim 9, wherein the identification information comprises configuration characteristics of the client terminal.

13. The method as recited in claim 9, wherein the network terminal executes Java code on the network terminal.

14. The method as recited in claim 9, wherein the same client application is executed on the server and the client terminal.

15. The method as recited in claim 9, wherein the non-network terminal receives commands from the client application on the server.

16. The method as recited in claim 9, including the step of passing a client application request to another server to process the request.

17. A computer program embodied on a computer-readable medium for enabling a distributed computing system, including a client terminal and a server which communicate via a network, comprising:

(a) a code segment for initiating connection of the client terminal to the server utilizing the network;

(b) a code segment for responding to the initial connection request at the server by transmitting an enquiry message to the client terminal;

(c) a code segment for responding to the enquiry message at the client terminal with a message comprising identification information indicative of the client terminal being a network terminal or a non-network terminal and identifying a client application the client terminal requires;

(d) a code segment for receiving and analyzing the identification information at the server computer to determine if the client terminal is a network terminal or a non-network terminal; and (d1) a code segment for loading a server application if the client terminal is a network terminal, which starts the client application if necessary, on the client terminal utilizing the network and starts a server application to service future requests from the client terminal; and (d2) a code segment for loading a server application, if necessary, on the server which initiates the client application on the server for processing the client application at the server on behalf of the client terminal, if the client terminal is a non-network terminal.

18. The computer program as recited in claim 17, wherein the start of the client application entails a download of the client application to the client terminal.

19. The computer program as recited in claim 17, including a code segment for communicating between the client terminal and the server utilizing a dial-up network connection.

20. The computer program as recited in claim 17, wherein the identification information comprises configuration characteristics of the client terminal.

21. The computer program as recited in claim 17, wherein the network terminal executes Java code on the network terminal.

22. The computer program as recited in claim 17, wherein the same client application is executed on the server and the client terminal.

23. The computer program as recited in claim 17, wherein the non-network terminal receives commands from the client application on the server.

24. The computer program as recited in claim 17, including a code segment for passing a client application request to another server to process the request.

25. The computer program as recited in claim 17, including a code segment for making a dial up connection appear to the server as a socket connection.

* * * * *